(12) United States Patent
Lu

(10) Patent No.: US 12,414,032 B2
(45) Date of Patent: Sep. 9, 2025

(54) RELAY METHOD, ROUTING TABLE GENERATION METHOD AND APPARATUS, TERMINAL, AND STORAGE MEDIUM

(71) Applicant: GUANGDONG OPPO MOBILE TELECOMMUNICATIONS CORP., LTD., Guangdong (CN)

(72) Inventor: Qianxi Lu, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 401 days.

(21) Appl. No.: 17/890,276

(22) Filed: Aug. 18, 2022

(65) Prior Publication Data
US 2022/0408344 A1 Dec. 22, 2022

Related U.S. Application Data

(63) Continuation of application No. PCT/CN2020/076485, filed on Feb. 24, 2020.

(51) Int. Cl.
*H04W 40/24* (2009.01)
*H04W 76/14* (2018.01)
*H04W 80/02* (2009.01)
*H04W 92/18* (2009.01)

(52) U.S. Cl.
CPC ......... *H04W 40/248* (2013.01); *H04W 76/14* (2018.02); *H04W 80/02* (2013.01); *H04W 92/18* (2013.01)

(58) Field of Classification Search
CPC ... H04W 40/248; H04W 76/14; H04W 80/02; H04W 92/18; H04W 40/22; H04W 88/04; H04W 80/04
See application file for complete search history.

(56) References Cited

U.S. PATENT DOCUMENTS 11,375,527 B1 * 6/2022 Eyuboglu .......... H04B 7/15528
2013/0016651 A1 * 1/2013 Zhang ..................... H04L 45/34
370/315
(Continued)

FOREIGN PATENT DOCUMENTS

| CN | 105657838 | 6/2016 | |
|---|---|---|---|
| CN | 105992273 | 10/2016 | |
| WO | 2018175817 | 9/2018 | |
| WO | WO-2021139771 A1 * | 7/2021 | ............ H04W 40/22 |

OTHER PUBLICATIONS

Huawei et al. "Layer 2 architecture for UE-to-Network Relay" 3GPP TSG RAN WG2 Meeting #95 R2-165464, Aug. 2016, pp. 1-6.
(Continued)

*Primary Examiner* — Michael K Phillips
(74) *Attorney, Agent, or Firm* — Hodgson Russ LLP

(57) ABSTRACT

The application discloses a relay method, a routing table generation method and apparatus, a terminal and a storage medium. The relay method is applied to a relay UE. The relay UE comprises a relay protocol stack, the relay protocol stack being located between a PDCP layer and a layer 2 protocol stack of a PC5 interface, or the relay protocol stack being a MAC layer protocol stack, and the relay protocol stack comprising a relay receiving entity and a relay sending entity. The relay method comprises: the relay receiving entity receiving a relay protocol data unit (PDU) sent by a last hop node, and forwarding the relay PDU to the relay sending entity; and the relay sending entity sending the relay PDU to a next hop node according to a protocol header of the relay PDU, the relay PDU being a PDU sent between at least two remote UEs.

20 Claims, 9 Drawing Sheets

(56) References Cited

U.S. PATENT DOCUMENTS

| | | | | |
|---|---|---|---|---|
| 2018/0116007 A1* | 4/2018 | Yasukawa | ......... | H04W 72/1263 |
| 2019/0021123 A1* | 1/2019 | Ma | ......... | H04W 12/02 |
| 2019/0373652 A1* | 12/2019 | Hong | ......... | H04W 76/14 |
| 2021/0160956 A1* | 5/2021 | Wang | ......... | H04W 40/34 |
| 2022/0361267 A1* | 11/2022 | Wang | ......... | H04W 76/14 |
| 2023/0063139 A1* | 3/2023 | Du | ......... | H04W 28/0268 |
| 2023/0073469 A1* | 3/2023 | Wang | ......... | H04W 40/22 |

OTHER PUBLICATIONS

"International Search Report (Form PCT/ISA/210) of PCT/CN2020/076485," mailed on Nov. 26, 2020, with English translation thereof, pp. 1-4.

"Written Opinion of the International Searching Authority (Form PCT/ISA/237) of PCT/CN2020/076485," mailed on Nov. 26, 2020, with English translation thereof, pp. 1-6.

ZTE, "Consideration on Routing in IAB Architecture 1a and 1b", 3GPP TSG-RAN WG2 #103 R2-1812469, Aug. 2018, pp. 1-4.

ZTE, "Discussion on layer 2 ProSe UE-to-network relay for feD2D", 3GPP TSG-RAN WG2 Meeting #95bis R2-166815, Oct. 2016, pp. 1-7.

OPPO, "TP on Layer-2 Relay Data Identification", 3GPP TSG-RAN2 Meeting #98 R2-1704097, May 2017, pp. 1-6.

Coolpad, "Discussion on Signaling Radio Bearer Modelling for L2 Relay UE", 3GPP TSG RAN WG2 Meeting #98 R2-1704553, May 2017, pp. 1-4.

"Search Report of Europe Counterpart Application No. 20915870.8", issued on Mar. 20, 2023, pp. 1-10.

* cited by examiner

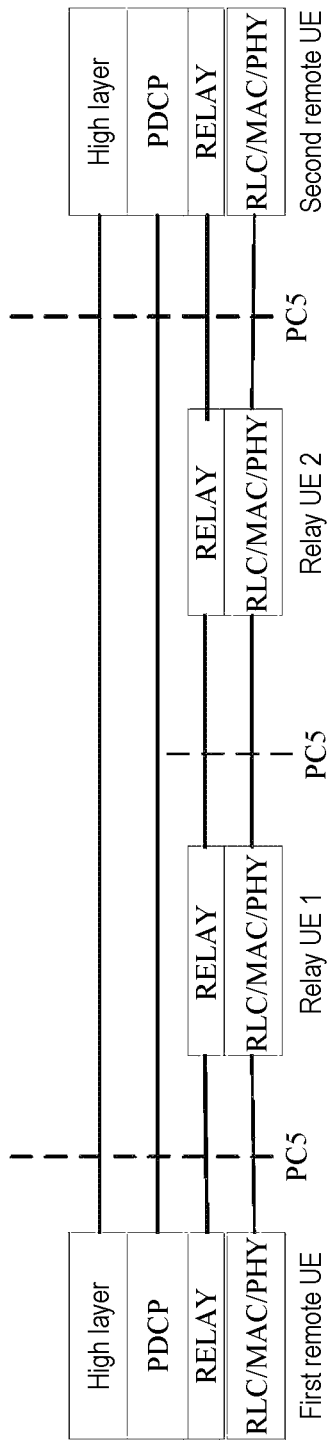
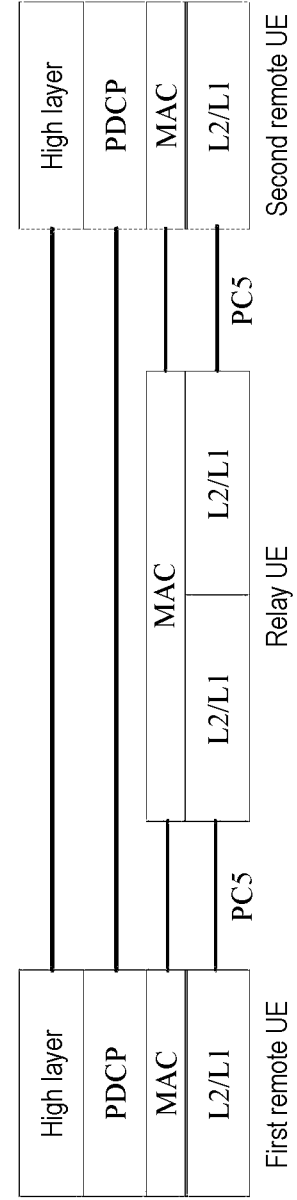
FIG. 2A
FIG. 2B

The relay sending entity receives the PDCP PDU transmitted by the PDCP layer protocol stack, generates a relay protocol data unit PDU according to the PDCP PDU, and sends the relay PDU to the next hop node — 410

FIG. 4

The relay receiving entity receives the relay PDU sent by the last hop node and forwards the relay PDU to the relay sending entity — 510

The relay sending entity sends the relay PDU to the next hop node according to the protocol header of the relay PDU — 520

FIG. 5

The relay receiving entity receives the relay protocol data unit (PDU) from the last hop node; and transmits the first PDCP PDU in the relay PDU to the PDCP layer — 610

FIG. 6

RELAY METHOD, ROUTING TABLE GENERATION METHOD AND APPARATUS, TERMINAL, AND STORAGE MEDIUM

CROSS-REFERENCE TO RELATED APPLICATION

This application is a continuation of international PCT application serial no. PCT/CN2020/076485, filed on Feb. 24, 2020. The entirety of the above-mentioned patent application is hereby incorporated by reference herein and made a part of this specification.

BACKGROUND

Technology Field

The application relates to the field of wireless communication, and particularly, to a relay method, a routing table generation method and an apparatus, a terminal, and a storage medium.

Description of Related Art

In the 5th generation wireless systems (5G), a remote UE can be connected to another remote UE through one or more relay UE, so as to implement the communication between the remote UE and the remote UE.

In the related art, the remote UE may be connected to the relay UE through a PC5 interface. In implementation, the mapping relationship between the local index and the radio bearer identifier may be configured through the network equipment, and the configuration relationship may be sent to the relay UE, where the local index is used to identify the remote UE, and the radio bearer identifier is used to identify the radio bearer. Accordingly, the remote UE sends a relay protocol data unit (PDU) to the relay UE, and the relay PDU carries the local index of the remote UE. The relay UE receives the relay PDU, determines the corresponding radio bearer according to the local index and the mapping relationship, and sends the relay PDU to another remote UE through the radio bearer.

However, in the solution provided by the related art, the mapping relationship between the remote UE and the radio bearer requires to be configured by the network equipment through additional signaling, so the communication between the two remote UEs can be implemented. The transmission overhead is relatively large, resulting in the delay of the service of the remote UE.

SUMMARY

The embodiments of the application provide a relay method, a routing table generation method and an apparatus, a terminal, and a storage medium. By introducing the relay protocol layer into the protocol stack of the relay UE, the relay sending entity and the relay receiving entity can send and receive relay PDUs of adjacent nodes and can independently determine the next hop node according to the protocol header of the relay PDU. The technical solution is as follows.

According to an aspect of the application, a relay method is provided, which is applied to relay UE. The relay UE includes a relay protocol stack. The relay protocol stack is located between a PDCP layer and a layer 2 protocol stack of a PC5 interface, or the relay protocol stack is a MAC layer protocol stack. The relay protocol stack includes a relay receiving entity and a relay sending entity. The relay method includes steps as follows.

The relay receiving entity receives a relay protocol data unit (PDU) sent by the last hop node and forwards the relay PDU to the relay sending entity.

The relay sending entity sends the relay PDU to the next hop node according to a protocol header of the relay PDU.

The relay PDU is a PDU sent between at least two remote UEs.

According to an aspect of the application, a relay method is provided, which is applied to first remote UE. The first remote UE includes a relay protocol stack. The relay protocol stack is located between a PDCP layer and a layer 2 protocol stack of a PC5 interface, or the relay protocol stack is a MAC layer protocol stack. The relay protocol stack includes a relay sending entity, and the relay method includes steps as follows.

The relay sending entity receives a PDCP PDU transmitted by the PDCP layer protocol stack, generates a relay protocol data unit (PDU) according to the PDCP PDU, and sends the relay PDU to the next hop node.

The relay PDU is a PDU sent between at least two remote UEs.

According to an aspect of the application, a relay method is provided, which is applied to second remote UE. The second remote UE includes a relay protocol stack. The relay protocol stack is located between a PDCP layer and a layer 2 protocol stack of a PC5 interface, or the relay protocol stack is a MAC layer protocol stack. The relay protocol stack includes a relay sending entity, and the relay method includes steps as follows.

The relay receiving entity receives a relay protocol data unit (PDU) from the last hop node and transmits a first PDCP PDU in the relay PDU to the PDCP layer.

The relay PDU is a PDU sent between at least two remote UEs.

According to an aspect of the application, a routing table generation method is provided, and the routing table generation method includes steps as follows.

A relay protocol data unit (PDU) sent by a last hop node is received, where a protocol header of a relay PDU includes a first source ID, and the first source ID includes a UE ID of first remote UE.

When no routing relationship corresponding to the first source ID is included in a relay routing table, a second routing relationship is established in the relay routing table based on the first source ID and a node ID of the last hop node.

The relay PDU is a PDU sent between two remote UEs, and the second routing relationship is a routing relationship when the UE ID of the first remote UE is used as a destination ID.

According to an aspect of the application, a relay apparatus is provided, which is applied in the relay apparatus. The relay apparatus includes a relay protocol stack. The relay protocol stack is located between a packet data convergence protocol (PDCP) layer and a layer 2 protocol stack of a PC5 interface, or the relay protocol stack is a media access control MAC layer protocol stack. The relay protocol stack includes a relay receiving module and a relay sending module.

The relay receiving module is configured to receive the relay protocol data unit (PDU) sent by a last hop node and forward the relay PDU to the relay sending module.

The relay sending module is configured to send the relay PDU to a next hop node according to a protocol header of the relay PDU.

The relay PDU is a PDU sent between at least two remote UEs.

According to an aspect of the application, a relay apparatus is provided, which is applied to first remote UE. The first remote UE includes a relay protocol stack. The relay protocol stack is located between a packet data convergence protocol (PDCP) layer and a layer 2 protocol stack of a PC5 interface, or the relay protocol stack is a MAC layer protocol stack. The relay protocol stack includes a relay sending module.

The relay sending module receives a PDCP PDU transmitted by the PDCP layer protocol stack, generates a relay protocol data unit (PDU) according to the PDCP PDU, and sends the relay PDU to the next hop node;

The relay PDU is a PDU sent between at least two remote UEs.

According to an aspect of the application, a relay apparatus is provided, which is applied to second remote UE. The second remote UE includes a relay protocol stack. The relay protocol stack is located between a packet data convergence protocol (PDCP) layer and a layer 2 protocol stack of a PC5 interface, or the relay protocol stack is a media access control MAC layer protocol stack. The relay protocol stack includes a relay receiving module.

The relay receiving module is configured to receive the relay protocol data unit (PDU) from a last hop node and transmit a first PDCP PDU in the relay PDU to the PDCP layer.

The relay PDU is a PDU sent between at least two remote UEs.

According to an aspect of the application, a routing table generation apparatus is provided, the apparatus includes a receiving module and an establishing module.

The receiving module is configured to receive a relay protocol data unit (PDU) sent by a last hop node, where a protocol header of the relay PDU includes a first source ID, and the first source ID includes a UE ID of first remote UE.

The establishing module is configured to establish a second routing relationship in a routing table based on the first source ID and a node ID of the last hop node when no routing relationship corresponding to the first source ID is included in the relay routing table.

The relay PDU is a PDU sent between two remote UEs, and the second routing relationship is a routing relationship when the UE ID of the first remote UE is used as a destination ID.

According to an aspect of the application, a terminal is provided. The terminal includes a processor; a transmitter connected to the processor; memory for storing executable instructions for the processor; where the processor is configured to load and execute the executable instructions to implement the relay method or the routing table generation method described in the above aspects.

According to an aspect of the application, a computer-readable storage medium is provided. Executable instructions are stored in the readable storage medium, and the executable instructions are loaded and executed by a processor to implement the relay method or the routing table generation method described in the above aspects.

The technical solutions provided by the embodiments of the application include at least beneficial effects as follows.

In the indirect communication mode between two remote UEs, the application introduces a relay protocol layer into the protocol stack of the relay UE, so that the relay sending entity and the relay receiving entity can send and receive the relay PDU of adjacent nodes and can independently determine the next hop node according to the protocol header of the relay PDU without determining the next hop node ID according to the corresponding mapping relationship configured by the network equipment. The relay PDU is then sent to the next hop node indicated by the next hop node ID, which saves the transmission overhead and improves the transmission efficiency.

Meanwhile, the application also provides two possible positions of the relay protocol stack. The relay protocol stack can be located between the PDCP layer and the layer 2 protocol stack or can be implemented through the original MAC layer, which improves the flexibility of the configuration of the relay method.

BRIEF DESCRIPTION OF THE DRAWING

In order to clearly illustrate the technical solutions in the embodiments of the application, the technical solutions are illustrated below with reference to the drawings in the embodiments of the application. Obviously, the illustrated embodiments are a part of the embodiments of the application but not all of the embodiments. According to the embodiments in the application, all other embodiments obtained by those ordinary skill in the art without creative work shall fall within the protection scope of the application.

FIG. 2A and FIG. 2B are schematic views of a relay protocol stack provided by an exemplary embodiment of the application.

FIG. 4 is a flowchart of a relay method provided by an exemplary embodiment of the application.

FIG. 5 is a flowchart of a relay method provided by an exemplary embodiment of the application.

FIG. 6 is a flowchart of a relay method provided by an exemplary embodiment of the application.

DESCRIPTION OF THE EMBODIMENTS

Figure 1:
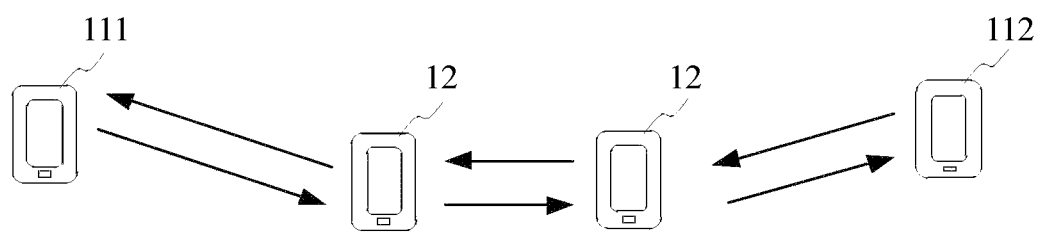
FIG. 1 is a block diagram of a communication system provided by an exemplary embodiment of the application.

In order to make the objectives, technical solutions and advantages of the application clearer, the embodiments of the application will be further described in detail below with reference to the accompanying drawings.

First, a brief introduction to the terms involved in the embodiments of the application is illustrated as follows.

Different Protocol Entities in the Protocol Stack of a Radio Access Network:

1) Service data adaptation protocol (SDAP): responsible for mapping quality-of-service (QoS) bearers to radio bearers according to quality-of-service (QoS) requirements. This protocol layer does not exist in the long term evolution (LTE) system, but in new radio (NR), such a protocol entity is required for processing new QoS when being connected to the 5G core network.

2) Packet data convergence protocol (PDCP): implementing IP header compression, encryption, and integrity protection. The protocol also handles retransmission, sequential transmission, and deduplication when switching. For dual connectivity with separate bearers, the PDCP can provide routing and replication, that is, one PDCP entity for each radio bearer of the terminal is configured.

3) Radio-link control (RLC): responsible for data segmentation and retransmission. The RLC serves the PDCP in a form of a RLC signaling, and one RLC entity is configured to each RLC channel (corresponding to each radio bearer) for one terminal. To reduce delay, compared with the long term evolution (LTE), RLC in new radio (NR) does not support sequential transmission of data to higher protocol layers.

4) Medium-access control (MAC): responsible for multiplexing of logical channels, hybrid automatic repeat requests (HARQs), schedulings, and functions related to scheduling. The MAC is configured for scheduling functions for uplink and next hop node and is disposed in network equipment. The MAC serves the RLC in a form of logical channels. The NR changes the header structure of the MAC, so that compared with LTE, low-latency processing can be effectively supported.

5) Physical layer (PHY): responsible for encoding and decoding, modulation, demodulation, multi-antenna mapping, and other typical physical layer functions. The physical layer serves the MAC layer in a form of transmission channels.

As an example, when it is given that three IP data packets include a data packet 1, a data packet 2, and a data packet 3, the data packet 1 and data packet 2 are on one radio bearer a, and the data packet 3 is on another radio bearer b. The SDAP protocol maps IP data packets to different bearers, the data packets 1 and 2 are mapped to radio bearer a, and the data packet 3 is mapped to radio bearer b. Usually, data entities from or to higher protocol layers are called service data units (SDUs), the data entities from or to the lower protocol layers are called protocol data units (PDUs). Therefore, the output of SDAP is SDAP PDU, which is equivalent to PDCP SDU.

The PDCP protocol performs (optionally) IP header compression on each radio bearer, and then performs encryption. According to the configuration, it may be decided whether to add a PDCP header. The header information includes the information required for terminal decryption and the sequence number for retransmission and sequential transmission. The output of the PDCP is forwarded to the RLC.

If required, the RLC protocol segments PDCP PDUs and adds an RLC header including sequence numbers for processing the retransmission. Unlike LTE, the RLC in the NR does not provide higher protocol layers with a data sequential transmission service. The reordering mechanism introduces additional latency, so this latency can be detrimental to services that require very low latency. Sequential transmission can be provided by the PDCP layer if it is really required.

RLC PDUs are sent to the MAC layer, which multiplexes multiple RLC PDUs and adds MAC headers to form new transmission blocks. The physical layer serves the MAC layer in a form of transmission channels. A transmission channel is defined by the manner and characteristics of the transmission of information over a wireless interface. Data on a transmission channel is organized into transmission blocks. In each transmission time interval (TTI), at most one transmission block of dynamically variable size is sent to or sent by the terminal through the wireless interface.

To support priority handling, the MAC layer can multiplex multiple logical channels onto a transmission channel, where each logical channel has its own RLC entity. At the receiving end, the MAC layer is responsible for the corresponding demultiplexing and forwarding of the RLC PDUs to their respective RLC entities. To support demultiplexing at the receiving end, the MAC header is required, the subheader of each MAC SDU is placed before the SDU, and the PDU can be preprocessed before the scheduling decision is received. The subheader includes the logical channel index (LCID) of the logical channel receiving the RLC PDU and the length (in bytes) of the PDU and may further include reserved bits for requirements or for future use.

Radio bearer: a collection of radio logical resources, which are divided into signaling radio bearers (SRBs) and data radio bearers (DRBs), and the DRB are further divided into default bearers and dedicated bearers.

Communication links between communication equipments, such as between a UE and network equipment, between two terminals, and between two network equipments, may be facilitated using one or more radio bearers.

PC5 interface: an interface introduced between communication equipment and communication equipment. Currently, the PC5 interface can be configured to transmit device to device (D2D) discovery, device to device (D2D) communication, and vehicle-to-everything (V2X).

Relay PDU: a PDU corresponding to the relay protocol stack. The relay PDU may include information from the upper layers of the relay protocol stack as well as information from the layer of the relay protocol stack.

Sidelink mode: an important branch of cellular IoT technology, i.e., IoT communication technology. The sidelink mode can satisfy direct communication between two pieces of user equipment (UE). Before transmission, no pre-connection is required between UE, which allows a faster and more efficient connection method between UE provided by the sidelink mode.

FIG. 1 is a block diagram of a communication system provided by an exemplary embodiment of the application. The communication system may include first remote UE 111, a second remote UE 112, and several relay UE 12. In the illustrated communication system, the communication process may require no participation of the network equipment.

The relay UE 12 is a terminal device disposed in the communication system to provide relay service for communication between remote UE. The first remote UE 111 may be connected to the relay UE 12 through the PC5 interface of the third generation partnership project (3GPP) system, and the second remote UE 112 may be connected to the relay UE 12 through the PC5 interface.

In the communication process between the first remote UE 111 and the second remote UE 112, it may be that the first remote UE 111 sends a relay PDU to the relay UE, and the relay UE receives the relay PDU and forwards the relay PDU to the second remote UE 112.

The relay UE 12 (or the first remote UE 111, or the second remote UE 112) may include various equipment, such as handheld devices with wireless communication function, in-vehicle devices, wearable devices, computing devices, or other processing devices connected to a wireless modem equipment, and various forms of user equipment, mobile stations (MSs), terminal devices, and the like.

Note that the quantity of relay UE 12 shown in FIG. 1 is only intended for illustration but not intended to limit the disclosure. The communication system may include any suitable quantity of relay UE.

The technical solutions of the embodiments of the application can be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD) system, an advanced long term evolution (LTE-A) system, a new radio (NR) system, an evolution system of NR system, an LTE-based access to unlicensed spectrum (LTE-U) system, an NR-U system, a universal mobile telecommunication system (UMTS), a worldwide interoperability for microwave access (WiMAX) communication system, a wireless local area network (WLAN), wireless fidelity (WiFi), a next generation communication system, or other communication systems, and the like.

In general, conventional communication systems support a limited number of connections and are easy to implement. However, with the development of communication technology, mobile communication systems may support not only conventional communication but also communication, such as device to device (D2D) communication, machine to machine (M2M) communication, machine type communication (MTC), vehicle to vehicle (V2V) communication, the vehicle to everything (V2X) system, and the like. The embodiments of the application can also be applied to these communication systems.

In the communication system as shown in FIG. 1, the first remote UE, the relay UE, and the second remote UE all include a layer of relay protocol stack. The function of the relay protocol stack contributes to the implementation of transmitting data packets between two remote UEs through the relay UE. For the position of the relay protocol stack in the protocol stack, the application illustrates two examples of possibilities: the relay protocol stack is disposed between the PDCP layer and the layer 2 protocol stack of the PC5 interface; or the relay protocol stack is a media access control (MAC) layer protocol stack.

For example, with reference to FIG. 2A, the relay protocol stack is the RELAY layer. The RELAY layer is between the PDCP layer and the layer 2 protocol stack of the PC5 interface. The layer 2 protocol stack includes the RLC layer protocol stack and the MAC layer protocol stack.

For example, with reference to FIG. 2B, the functions of the relay protocol stack are implemented through the MAC layer. The MAC layer is between the PDCP layer and the layer 2 protocol stack of the PC5 interface.

Figure 3:
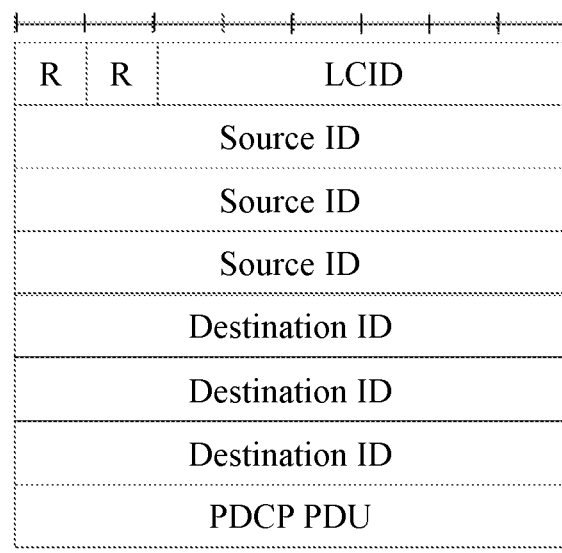
FIG. 3 is a schematic view of a format of a relay PDU provided by an exemplary embodiment of the application.

FIG. 3 is a schematic view of a format of a relay PDU provided by an exemplary embodiment of the application. In addition to the R bit identifying a reserved bit, the relay PDU may also include a logical channel index (LCID), a source identifier (source ID), and a destination identifier (destination ID).

The SOURCE ID and DESTINATION ID are the unique identifiers of the remote UE or the relay UE. When the relay protocol layer receives the relay PDU, the source of the relay PDU can be determined according to the source ID included in the relay PDU. Where the relay PDU is required to be sent can be determined according to the destination ID included in the relay PDU.

In the format of the relay PDU, a specific destination ID can be reserved for being identified as a broadcast ID, this means that the transmitted relay PDU is broadcasted by the first remote UE to all connected relay UE and other remote UE, and this destination ID cannot be occupied by relay UE and other remote UE.

Optionally, the logical channel index (LCID) in the format of the relay PDU can also be implemented as a radio bearer identifier DRB (ID) or SRB ID instead.

In the embodiments of the application, two types of relay PDUs are illustrated. One is a relay PDU sent by the first remote UE to other remote UE. The relay PDU can be a broadcast relay PDU broadcasted and sent by the first remote UE or a first relay PDU uncasted and sent by the first remote UE to the second remote UE. The other is a second relay PDU sent by the second remote UE to the first remote UE. Both of the two relay PDUs depend on the relay service of one or more relay UE.

In the application, the relay protocol stack includes a relay receiving entity and a relay sending entity. For the relay PDU, the working principle of the relay receiving entity and the relay sending entity is illustrated as follows.

2) The working principle of the relay receiving entity is as follows.

For each received relay PDU, if the relay PDU adopts the format shown in FIG. 3, the relay protocol can obtain the source ID, the destination ID, the radio bearer identifier, and the PDCP PDU. Except the PDCP PDU, the rest are disposed in the protocol header of the relay PDU. The identifier of the node that receives the relay PDU is a neighbor identifier Prior ID.

Regarding the Handling of Source IDs:

If the source ID in the relay PDU is not in the relay routing table established by the node, the source ID is used as the destination ID in the opposite direction. If the source ID of the relay PDU is the Source ID, and the neighbor ID that receives the relay PDU is the Prior ID, a route: (Source ID, Prior ID) is recorded. If this is a relay UE directly connected to a remote UE, the Prior ID in the route is the same as the Source ID.

Regarding the Handling of Destination IDs:

If the destination ID and the identifier of the node are the same, or the destination ID is reserved for broadcast messages or data packets, the radio bearer identifier and the PDCP PDU are transmitted to the upper-layer protocol. If the destination ID is different from the identifier of the node, or the destination ID is reserved for broadcast messages or data packets, the destination ID may be transmitted to the relay sending entity of the relay protocol, and the relay sending entity may send the broadcast message or data packet to all other nodes connected to the relay UE.

2) The working principle of the relay sending entity is as follows.

Regarding the Handling of SDUs from Higher Layers:

The upper layer protocol transmits the information required to generate the relay PDU to the relay protocol stack, including the PDCP PDU, the source ID, the destination ID, and the radio bearer identifier, which are all transmitted to the relay sending entity of the relay protocol.

The relay sending entity may generate the relay PDU according to the relay PDU format shown in FIG. 3.

Regarding the Handling of Relay PDUs:

Regardless of either the relay PDU generated by the relay sending entity or the relay PDU obtained from the relay receiving entity, the relay sending entity may obtain the destination ID of the next hop node according to the existing relay routing table. If the destination ID is not in the relay routing table, the default next hop node is selected.

Note that, in the related art, the local index is used to identify the remote UE, and the radio bearer identifier is used to distinguish the radio bearers. The first remote UE establishes at least one radio bearer and sends a relay PDU to the relay UE, where the relay PDU carries the local index of the first remote UE. The relay UE receives the relay PDU and determines the radio bearer for communication between the relay UE and the second remote UE according to the local index and the stored mapping relationship between the local index and the radio bearer identifier, and then the relay PDU is sent to the second remote UE through the radio bearer. The mapping relationship between the local index and the radio bearer identifier needs to be configured by the network equipment, and the configuration result is notified to the relay UE.

In the application, address information in the relay protocol and the relay routing table are compiled and created in a distributed and autonomous manner, that is, the address information and the relay routing table can be dynamically compiled, created, and maintained along with the transmission of data packets rather than configured by the network equipment.

The first remote UE is the terminal that sends the relay PDU. In the subsequent paragraphs, the relay method applied to the side of the first remote UE is illustrated.

FIG. 4 is a flowchart of a relay method provided by an exemplary embodiment of the application, and the relay method can be applied to the first remote UE 111 in the communication system shown in FIG. 1. The relay method includes steps as follows.

In step 410, the relay sending entity receives the PDCP PDU transmitted by the PDCP layer protocol stack, generates a relay protocol data unit (PDU) according to the PDCP PDU, and sends the relay PDU to the next hop node.

The relay PDU is a PDU sent between at least two remote UEs.

The first remote UE refers to terminal equipment that performs point-to-point communication with the relay UE and then can communicate with other remote UE (e.g., the second remote UE) through the relay UE. Different from the way in which the first remote UE and the second remote UE perform direct communication through a slidelink, the communication between the first remote UE and the second remote UE is an indirect communication mode.

The first remote UE includes a relay protocol stack, and the relay protocol stack includes a relay sending entity. Optionally, the functions of the relay protocol stack include but are not limited to generating a routing table, forwarding data packets whose destination address is not the local node, processing data packets whose destination address is the local node, and processing broadcast data packets.

Regarding the position of the relay protocol stack in the protocol stack of the first remote UE, as shown in FIG. 2A and FIG. 2B, the application illustrates examples of two possibilities: the relay protocol stack is located between the PDCP layer and the layer 2 protocol of the interface PC5 between stacks; or the relay protocol stack is a MAC layer protocol stack.

Optionally, the PDCP layer protocol stack is an upper layer protocol stack of the relay protocol stack. When the relay protocol stack receives the PDCP PDU transmitted by the PDCP layer protocol stack, the relay sending entity may perform operations such as adding the header of the relay protocol stack to the PDCP PDU to generate a new transmission block, that is, the relay PDU, and the relay sending entity may send the relay PDU to the next hop node.

Optionally, the next hop node is a relay UE around the first remote UE.

The foregoing relay PDU may be a first relay PDU uncasted and sent by the first remote UE to the second remote UE, or the foregoing relay PDU may be a broadcast relay PDU broadcasted and sent by the first remote UE to other remote UE. An exemplary description of the is illustrated in the subsequent paragraphs.

In case 1, the relay PDU includes a first relay PDU; the first relay PDU is a PDU sent by the first remote UE to the second remote UE.

The first remote UE attempts to perform unicast communication with the second remote UE and sends the first relay PDU to the second remote UE.

Optionally, the protocol header of the first relay PDU includes a first source ID and a first destination ID; the first source ID includes the UE ID of the first remote UE; the first destination ID includes the UE ID of the second remote UE.

The source ID is an identifier used to identify the source of the relay PDU. After receiving the first relay PDU, other terminals (relay UE or other remote UE) may determine that the first relay PDU is the relay PDU transmitted by the first remote UE according to the first source ID in the first relay PDU.

The destination ID is an identifier used to identify the destination UE of the relay PDU. After receiving the first relay PDU, other terminals (relay UE or other remote UE) may determine whether the relay PDU is a relay PDU for these other terminals according to the first destination ID. For example, when the first destination ID is the UE ID of the second remote UE, and after receiving the first relay PDU, the relay UE determines that the relay PDU is not a PDU for itself through the first destination ID, then the first relay PDU may be forwarded.

Optionally, the relay PDU is sent to the next hop node, which includes when the relay sending entity has a first routing relationship corresponding to the first destination ID in the relay routing table, the first relay PDU is sent to the next hop node according to the first routing relationship; the first routing relationship includes a UE ID of the second remote UE, and a node ID of the next hop node, and the first routing relationship is a routing relationship when the UE ID of the second remote UE is used as the destination ID.

For example, the first destination ID (i.e., the UE ID of the second remote UE) is RMUE2, a first routing relationship (RMUE2, RLUE2) is included in the relay routing table, and the destination ID in the first routing relationship is the UE ID RMUE2 of the second remote UE. The first destination ID corresponds to the first routing relationship, and the node Relay UE2 corresponding to the identifier RLUE2 is the next hop node.

Optionally, the first relay PDU further includes a first PDCP PDU. The first PDCP PDU includes at least one of a first signaling and a first data packet, the first signaling is a signaling related to the first remote UE as the sender, and the first data packet is a data packet related to the first remote UE as the sender.

The first relay PDU may include the first PDCP PDU. Since the first relay PDU is the first relay PDU sent by the first remote UE to the second remote UE, the first PDCP PDU may include a signaling related to the first remote UE or may include a first Data packet related to the remote UE. The embodiments of the application do not limit the specific content of the first signaling and the first data packet.

In Case 2, the relay PDU includes a broadcast relay PDU; the broadcast relay PDU is a PDU broadcasted and sent by the first remote UE to other remote UE. The first remote UE attempts to perform broadcast communication with other remote UE and sends broadcast relay PDUs to several other remote UEs.

Optionally, the protocol header of the broadcast relay PDU includes a first source ID and a first destination ID. The first source ID includes a UE ID of the first remote UE; and the first destination ID includes a broadcast ID.

The source ID is an identifier used to identify the source of the relay PDU. After receiving the broadcast relay PDU, other terminals (relay UE or other remote UE) may determine that the broadcast relay PDU is a relay PDU sent by the first remote UE according to the first source ID.

The destination ID is an identifier used to identify the destination UE of the relay PDU. Optionally, when the destination ID is a broadcast ID, the broadcast ID may be agreed between communication equipment, such as "0XFFFFFF". Since the destination ID is the broadcast ID, the destination UEs of the broadcast relay PDU are multiple other terminals (relay UE or other remote UE). After receiving the broadcast relay PDU, other terminals can determine that the broadcast relay PDU is a PDU broadcasted and sent by the first remote UE according to the destination ID and can parse the broadcast relay PDU and transmit part of the content in the broadcast relay PDU to the upper layer protocol.

Optionally, the relay receiving entity receives the second relay PDU, the second relay PDU is a PDU sent by the second remote UE to the first remote UE, and a second source identifier (source ID) of the second relay PDU includes the UE ID of the second remote UE. The first routing relationship in the relay routing table is established when the routing relationship between the relay receiving entity and the second source ID corresponding to the relay receiving entity is not included in the relay routing table.

When the relay receiving entity finds that the second source ID is a new source ID after receiving a second source ID, a record may be added in the relay routing table to establish a new routing relationship.

For example, the second source ID (i.e., the UE ID of the second remote UE) is RMUE2, the current node is the first remote UE, the last hop node is the relay UE Relay UE2, and the node ID of the last hop node is RLUE2. The routing relationship corresponding to the second source ID refers to a routing relationship in which the destination ID bit of the routing relationship is the same as the second source ID, such as the routing relationship (RMUE2, RLUE1). The node ID of the relay UE Realy UE1 is RLUE1. When no routing relationship corresponding to the second source ID is included in the relay routing table, the relay receiving entity may use the second source ID as the destination ID in the opposite direction and establish the second routing relationship (RMUE2, RLUE2) in the relay routing table.

Optionally, the broadcast relay PDU further includes a first PDCP PDU, and the first PDCP PDU includes at least one of a broadcast data packet and a broadcast signaling.

The broadcast relay PDU may include the first PDCP PDU. Since the broadcast relay PDU is a broadcast relay PDU sent by the first remote UE to other remote UE, the first PDCP PDU may include a broadcast signaling or a broadcast data packet. The embodiments of the application do not limit the specific content of broadcast signaling and broadcast data packets.

In an example, when the relay protocol stack is located between the PDCP layer and the layer 2 protocol stack of the PC5 interface, the relay PDU further includes a first radio bearer identifier; when the relay protocol stack is a MAC layer protocol stack, the relay PDU further includes a first logical channel index.

The first radio bearer identifier is an identifier for distinguishing radio bearers between remote UE. The radio bearer can be a signaling radio bearer (SRB) or a data radio bearer (DRB). Because the first remote UE is in the sidelink mode, the SRB is the sidelink signaling radio bearer (SL SRB), DRB is the sidelink data radio bearer (SL DRB), and the corresponding first radio bearer identifiers are the SL SRB ID and the SL DRB ID, respectively. When the relay protocol stack is located between the PDCP layer and the layer 2 protocol stack of the PC5 interface, the destination end (i.e., the second remote UE) of the relay PDU can determine the radio bearer between the two remote UEs through the first radio bearer identifier.

The first logical channel index (LCID) is an identifier for distinguishing logical channels between the MAC layer and the RLC layer. When the relay protocol stack is implemented in the MAC layer, the PDCP PDU multiplexed in the MAC layer is associated with the first logical channel index (LCID), there is a one-to-one mapping relationship between the radio bearer and the first logical channel index, the destination end of the relay PDU (i.e., the second remote UE) may determine the radio bearer between the two remote UEs through the forgoing first logical channel index.

In one example, the end-to-end protocol stack between at least two remote UEs includes a PDCP layer protocol stack of the PC5 interface and other protocol layers located above the PDCP protocol layer.

Optionally, other protocol layers above the PDCP protocol layer include other user plane protocol layers, such as SDAP and IP protocol layers, and other control plane protocol layers, such as a RRC layer and a non-access stratum (NAS).

In an example, the point-to-point protocol stack between the first remote UE and the next hop node includes a layer 2 protocol stack and a layer 1 protocol stack of the 3GPP PC5 interface. The layer 2 protocol stack includes an RLC layer protocol stack and a MAC layer protocol stack, and layer 1 protocol stack includes a PHY layer protocol stack.

Optionally, the next hop node refers to the relay UE around the first remote UE. Note that the layer 1 protocol stack and layer 2 protocol stack include but are not limited to an RLC layer protocol stack, a MAC layer protocol stack, and a PHY layer protocol stack, which are not limited in the embodiments of the application.

In an example, the relay protocol stack further includes a relay receiving entity; the relay receiving entity receives a second relay PDU, and the second relay PDU is a relay PDU sent by the second remote UE to the first remote UE.

After the first remote UE successfully sends the relay PDU to the second remote UE, a route from the first remote UE to the second remote UE is established, and the route is stored in the relay routing table of the relay UE and the second remote UE. When sending the second relay PDU to the first remote UE, the second remote UE may send the second relay PDU to the first remote UE through the established route. The first remote UE may receive the second relay PDU through the relay receiving entity.

Optionally, the second relay PDU includes a second PDCP PDU; and the relay receiving entity transmits the second PDCP PDU to an upper layer protocol.

Optionally, when the relay protocol stack is located between the PDCP layer and the layer 2 protocol stack of the PC5 interface, the second relay PDU further includes a second radio bearer identifier, and the relay receiving entity transmits the second radio bearer identifier to the PDCP layer protocol stack; or when the relay protocol stack is a MAC layer protocol stack, the second relay PDU further includes a second logical channel index, and the relay receiving entity transmits the second logical channel index to the PDCP layer protocol stack.

After receiving the second relay PDU, the first remote UE may transmit the second PDCP PDU and the second radio bearer identifier (or the second logical channel index) in the second relay PDU to the PDCP layer protocol stack.

In an example, when a sidelink exists between the first remote UE and the second remote UE, the relay PDU is directly sent to the second remote UE through the slidelink.

Optionally, when the first remote UE finds it possible to directly communicate with the second remote UE, the bypass of the relay UE is omitted, that is, data packets are sent and received through a point-to-point PC5 connection. In the process, the source ID and destination ID of the relay PDU can remain unchanged.

In summary, in the relay method provided in the embodiment, the first remote UE includes a relay protocol stack, and the relay protocol stack includes a relay sending entity. The relay sending entity can receive the PDCP PDU sent by the PDCP layer, generate the relay PDU according to the PDCP PDU, and send the relay PDU to the next hop node. The relay PDU is the PDU sent by the first remote UE to other remote UE. In the indirect communication mode between two remote UEs, the application introduces a relay protocol layer into the protocol stack of the first remote UE, so that the relay sending entity can generate and send the relay PDU. Moreover, in the transmission process, the first remote UE can independently determine the route for transmitting the relay PDU and determine the next hop node ID without reference to the corresponding mapping relationship configured by the network equipment, and the relay PDU is then sent to the relay UE indicated by the next hop node ID, which saves transmission overhead and improves transmission efficiency.

In the relay method provided in the embodiment, two possible positions of the relay protocol stack are provided. The relay protocol stack can be either located between the PDCP layer and the layer 2 protocol stack or implemented by the original MAC layer, which improves the flexibility of the configuration of the relay method.

The relay UE may receive and forward the relay PDU from the first remote UE or other relay UE. In the subsequent paragraphs, the relay method applied to the side of the relay UE is illustrated.

FIG. 5 is a flowchart of a relay method provided by an exemplary embodiment of the application, and the relay method can be applied to the relay UE 12 in the communication system shown in FIG. 1. The relay method includes the step as follows.

In step 510, the relay receiving entity receives the relay PDU sent by the last hop node and forwards the relay PDU to the relay sending entity.

The relay PDU is a PDU sent between at least two remote UEs.

A relay UE is a terminal that provides the communication between at least two remote UEs with a relay service.

Between at least two remote UEs, there may be one or more relay UE that assists communication. In the embodiment, only one relay UE is used to illustrate the relay method.

The relay UE includes a relay protocol stack, and the relay protocol stack includes: a relay receiving entity and a relay sending entity. Optionally, the functions of the relay protocol stack include but are not limited to: generating a routing table, forwarding data packets whose destination address is not the local node, processing data packets whose destination address is the local node, and processing broadcast data packets.

Regarding the position of the relay protocol stack in the protocol stack of the first remote UE, as shown in FIG. 2A and FIG. 2B, the application illustrates an example of two possibilities: the relay protocol stack is located between the PDCP layer and the layer 2 protocol of the interface PC5 between stacks; or the relay protocol stack is a MAC layer protocol stack.

Optionally, the last hop node of the relay UE may be the first remote UE, or may be another relay UE located between the first remote UE and the relay UE. For example, the first remote UE is connected to the second remote UE through a relay UE1, the relay UE refers to the relay UE1, and the last hop node of the relay UE is the first remote UE. For example, the first remote UE is connected to the second remote UE through Relay UE1 and Relay UE2 in sequence, the relay UE refers to Relay UE2, and the last hop node of the relay UE is Relay UE1.

The foregoing relay PDU may be a first relay PDU uncasted and sent by the first remote UE to the second remote UE, or the foregoing relay PDU may be a broadcast relay PDU broadcasted and sent by the first remote UE to other remote UE. An exemplary description of the two possibilities is illustrated in the subsequent paragraphs.

In Case 1, the relay PDU includes a first relay PDU; the first relay PDU is a PDU sent by the first remote UE to the second remote UE.

The first remote UE attempts to perform unicast communication with the second remote UE and sends the first relay PDU to the second remote UE.

Optionally, the protocol header of the first relay PDU includes a first source ID and a first destination ID; the first source ID includes the UE ID of the first remote UE; the first destination ID includes the UE ID of the second remote UE.

The first source ID is an identifier used to identify the source of the relay PDU. After receiving the first relay PDU, other terminals (relay UE or other remote UE) may determine that the first relay PDU is a relay PDU sent by the first remote UE according to the first source ID.

The first destination ID is an identifier used to identify the destination UE of the first relay PDU. After receiving the first relay PDU, other terminals (relay UE or other remote UE) may determine whether the relay PDU is a relay PDU sent to these other terminals according to the first destination ID.

Optionally, the relay PDU is forwarded to the relay sending entity, which includes forwarding the first relay PDU to the relay sending entity when the first destination ID is not equal to the UE ID of the relay UE.

For example, when the first destination ID is the UE ID of the second remote UE, after the relay UE receives the first relay PDU through the relay receiving entity, if it is determined by the destination ID that the first relay PDU is not a PDU for the relay UE, the first relay PDU may be forwarded to the relay sending entity, and the first relay PDU may not be transmitted to the upper layer through the relay receiving entity.

Optionally, the first relay PDU further includes a first PDCP PDU. The first PDCP PDU includes at least one of a first signaling and a first data packet, the first signaling is a signaling related to the first remote UE as the sender, and the first data packet is a data packet related to the first remote UE as the sender.

The first relay PDU may include the first PDCP PDU. Since the first relay PDU is the first relay PDU sent by the first remote UE to the second remote UE, the first PDCP PDU may include a signaling related to the first remote UE or may include a first Data packet related to the remote UE. The embodiments of the application do not limit the specific content of the first signaling and the first data packet.

In Case 2, the relay PDU includes a broadcast relay PDU; the broadcast relay PDU is a PDU broadcasted and sent by the first remote UE to other remote UE. The first remote UE attempts to perform broadcast communication with other remote UE and sends broadcast relay PDUs to several other remote UEs.

Optionally, the protocol header of the broadcast relay PDU includes a first source ID and a first destination ID. The first source ID includes a UE ID of the first remote UE; and the first destination ID includes a broadcast ID.

The first source ID is an identifier used to identify the source of the relay PDU. After receiving the relay PDU, other terminals (relay UE or other remote UE) may determine that the relay PDU is a relay PDU sent by the first remote UE according to the first source ID.

The first destination ID is an identifier used to identify the destination UE of the relay PDU. Optionally, when the first destination ID is a broadcast ID, the broadcast ID may be agreed between communication equipment, such as "0XFFFFFF".

Optionally, the relay PDU is forwarded to the relay sending entity, which includes the step in which the broadcast relay PDU is forwarded to the relay sending entity when the first destination ID includes a broadcast ID.

For example, since the first destination ID is a broadcast ID, after receiving the relay PDU, other terminals (relay UE or other remote UE) may determine that the relay PDU is a PDU broadcasted and sent by the first remote UE according to the broadcast ID and can process the relay PDU, such as uploading the relay PDU to the high-level protocol stack. In addition, the relay UE forwards the broadcast relay PDU to the relay sending entity, and then the broadcast relay PDU is forwarded to other terminals (relay UE or other remote UE) through the relay sending entity.

Optionally, the broadcast relay PDU further includes a first PDCP PDU, and the first PDCP PDU includes at least one of a broadcast data packet and a broadcast signaling.

The broadcast relay PDU may include the first PDCP PDU. Since the relay PDU is a broadcast relay PDU sent by the first remote UE to other remote UE, the first PDCP PDU may include a broadcast signaling or a broadcast data packet. The specific content of the broadcast signaling and the broadcast data packet of the application is not limited.

In step 520, the relay sending entity sends the relay PDU to the next hop node according to the protocol header of the relay PDU.

Optionally, the protocol header of the relay may include the first source ID and the first destination ID. The relay sending entity may forward the relay PDU to the next hop node according to the relevant information of the first source ID and the first destination ID. The next hop node may be another relay UE or remote UE (e.g., second remote UE). The foregoing relay PDU may be a first relay PDU uncasted and sent by the first remote UE to the second remote UE, or the foregoing relay PDU may be a broadcast relay PDU broadcasted and sent by the first remote UE to other remote UE. An exemplary description of the two possibilities is illustrated in the subsequent paragraphs.

Case 1: The relay PDU is the first relay PDU.

Optionally, step 520 is alternatively implemented as follows.

When the relay sending entity has a first routing relationship corresponding to the first destination ID in the relay routing table, the first relay PDU is sent to the next hop node according to the first routing relationship; the first routing relationship includes a UE ID of the second remote UE, and a node ID of the next hop node, and the first routing relationship is a routing relationship when the UE ID of the second remote UE is used as the destination ID.

A relay routing table is a table with routing relationships. Optionally, the relay routing table is created in a distributed and autonomous manner, that is, the relay routing table can be dynamically compiled, created, and maintained along with the transmission of data packets. In an example, the format of the routing table is shown in the below Table 1.

TABLE 1

| Destination ID | Next hop node ID |
|---|---|

When the relay PDU is the first relay PDU, the protocol header of the first relay PDU may include the first destination ID, and the first destination ID is the UE ID of the second remote UE. This indicates that the first relay PDU has the destination UE for sending which is the second remote UE.

For example, the first destination ID (i.e., the UE ID of the second remote UE) is RMUE2, a first routing relationship (RMUE2, RLUE2) is included in the relay routing table, and the destination ID in the first routing relationship is the UE ID RMUE2 of the second remote UE. The first destination ID corresponds to the first routing relationship, and the node Relay UE2 corresponding to the identifier RLUE2 is the next hop node.

In an example, when no first routing relationship corresponding to the first destination ID is included in the relay routing table, the relay sending entity sends the first relay PDU to the default next hop node, and the number of the default next hop nodes is at least one.

Optionally, a default next hop node is reserved in the routing table. If the first routing relationship cannot be looked up in the relay routing table, the default next hop node is selected, and the first relay PDU is sent to the default next hop node. The embodiments of the application do not limit the quantity of default next hop nodes.

Case 2: The relay PDU is a broadcast relay PDU.

Optionally, step 520 is alternatively implemented as follows.

The relay sending entity sends the broadcast relay PDU to the next hop node when the first destination ID includes the broadcast ID.

Since the first destination ID is a broadcast ID, this means that the relay PDU is a broadcast relay PDU. The relay UE may send the broadcast relay PDU to one or more other nodes. In this case, the application does not limit the quantity of next hop nodes.

In an example, the relay receiving entity establishes the second routing relationship in the relay routing table when no routing relationship corresponding to the first source ID is included in the relay routing table; and the second routing relationship includes the UE ID of the first remote UE and the node ID of the last hop node. The second routing relationship is a routing relationship when the UE ID of the first remote UE is used as the destination ID.

The relay receiving entity receives a new first source ID, where the first source ID may be the source ID in the first relay PDU or the source ID in the broadcast relay PDU. The relay UE may add a record in the relay routing table to establish a new routing relationship, that is, the second routing relationship.

For example, the first source ID (i.e., the UE ID of the first remote UE) is RMUE1, the current node is the relay UE Relay UE3, the last hop node is the relay UE Relay UE2, and the node ID of the last hop node is RLUE2. The routing relationship corresponding to the first source ID refers to a routing relationship in which the destination ID bit in the routing relationship is the same as the first source ID, such as the routing relationship (RMUE1, RLUE1). When no routing relationship corresponding to the first source ID is included in the relay routing table, the relay receiving entity may use the second source ID as the destination ID in the opposite direction and establish a second routing relationship (RMUE1, RLUE2) in the relay routing table.

In one example, the relay receiving entity receives a second relay PDU, the second relay PDU is a PDU sent by the second remote UE to the first remote UE, and the second source ID of the second relay PDU includes the UE ID of the second remote UE; the relay receiving entity establishes the first routing relationship in the relay routing table when no routing relationship corresponding to the second source ID is included in the relay routing table; the first routing relationship includes the UE ID of the second remote UE and the node ID of the last hop node; the first routing relationship is a routing relationship when the UE ID of the second remote UE is used as the destination ID.

After receiving a new source ID, the relay receiving entity may add a record in the relay routing table to establish a new routing relationship.

For example, the second source ID (i.e., the UE ID of the second remote UE) is RMUE2, the current node is the relay UE Relay UE1, the last hop node is the relay UE Relay UE2, and the node ID of the last hop node is RLUE2. The routing relationship corresponding to the second source ID refers to a routing relationship in which the destination ID bit in the routing relationship is the same as the second source ID, such as the routing relationship (RMUE2, RLUE1). When no routing relationship corresponding to the second source ID is included in the relay routing table, the relay receiving entity may use the second source ID as the destination ID in the opposite direction and establish a first routing relationship (RMUE2, RLUE2) in the relay routing table.

In an optional example, when the relay protocol stack is located between the PDCP layer and the layer 2 protocol stack of the PC5 interface, the relay PDU further includes a first radio bearer identifier; when the relay protocol stack is a MAC layer protocol stack, the relay PDU further includes a first logical channel index.

The first radio bearer identifier is an identifier for distinguishing radio bearers between remote UE. The radio bearer can be a signaling radio bearer (SRB) or a data radio bearer (DRB). Because the first remote UE is in the sidelink mode, the SRB is the sidelink signaling radio bearer (SL SRB), DRB is the sidelink data radio bearer (SL DRB), and the corresponding first radio bearer identifiers are the SL SRB ID and the SL DRB ID, respectively. When the relay protocol stack is located between the PDCP layer and the layer 2 protocol stack of the PC5 interface, the destination end (i.e., the second remote UE) of the relay PDU can determine the radio bearer between the two remote UEs through the first radio bearer identifier.

The first logical channel index (LCID) is an identifier for distinguishing logical channels between the MAC layer and the RLC layer. When the relay protocol stack is implemented in the MAC layer, the PDCP PDU multiplexed in the MAC layer is associated with the first logical channel index (LCID), there is a one-to-one mapping relationship between the radio bearer and the first logical channel index, the destination end of the relay PDU (i.e., the second remote UE) may determine the radio bearer between the two remote UEs through the forgoing first logical channel index.

In an optional example, the end-to-end protocol stack between at least two remote UEs includes a PDCP layer protocol stack of the PC5 interface and other protocol layers located above the PDCP protocol layer.

Optionally, other protocol layers above the PDCP protocol layer include other user plane protocol layers, such as SDAP and IP protocol layers, and other control plane protocol layers, such as a RRC layer and a non-access stratum (NAS).

In an optional example, the point-to-point protocol stack between the relay UE and the last hop node includes the layer 2 protocol stack and the layer 1 protocol stack of the PC5 interface, the layer 2 protocol stack includes the RLC layer protocol stack and the MAC layer protocol stack, and the layer 1 protocol stack includes the PHY layer protocol stack.

Optionally, the last hop node may be the first remote UE or another relay UE between the first remote UE and the relay UE. Note that the foregoing layer 1 protocol stack and layer 2 protocol stack include but are not limited to an RLC layer protocol stack, a MAC layer protocol stack, and a PHY layer protocol stack, which are not limited in the embodiments of the application.

In summary, in the relay method provided by the embodiment, the relay UE includes a relay protocol stack, and the relay protocol stack includes a relay receiving entity and a relay sending entity. The relay receiving entity can receive the relay PDU sent by the last hop node and transmit the relay PDU to the relay sending entity, and the relay sending entity sends the relay PDU to the next hop node. In the indirect communication mode between two remote UEs, the application introduces a relay protocol layer into the protocol stack of the relay UE, so that the relay sending entity and the relay receiving entity can send and receive the relay PDU of neighbor nodes and can independently determine the next hop node according to the protocol header of the relay PDU without determining the next hop node ID according to the corresponding mapping relationship configured by the network equipment. The relay PDU is then sent to the next hop node indicated by the next hop node ID, which saves the transmission overhead and improves the transmission efficiency.

In the relay method provided in the embodiment, two possible positions of the relay protocol stack are provided. The relay protocol stack can be either located between the PDCP layer and the layer 2 protocol stack or implemented by the original MAC layer, which improves the flexibility of the configuration of the relay method.

The second remote UE is a destination of the relay PDU and can receive the relay PDU forwarded by the relay UE. In the subsequent paragraphs, the relay method applied to the side of the second remote UE is illustrated.

FIG. 6 is a flowchart of a relay method provided by an exemplary embodiment of the application, and the relay method can be applied to the second remote UE 112 in the communication system shown in FIG. 1. The relay method includes steps as follows.

In step 610, the relay receiving entity receives the relay PDU from the last hop node; and transmits the first PDCP PDU in the relay PDU to the PDCP layer.

The relay PDU is a PDU sent between at least two remote UEs.

The second remote UE refers to terminal equipment that performs point-to-point communication with the relay UE and then can communicate with the first remote UE through the relay UE. Different from the way in which the first remote UE and the second remote UE perform direct communication through a slidelink, the communication between the first remote UE and the second remote UE is an indirect communication mode.

The second remote UE includes a relay protocol stack. Optionally, the functions of the relay protocol stack include but are not limited to generating a routing table, forwarding data packets whose destination address is not the current node, processing data packets whose destination address is the current node, and processing broadcast data packets.

Regarding the position of the relay protocol stack in the protocol stack of the second remote UE, as shown in FIG. 2A and FIG. 2B, the application illustrates two examples of possibilities: the relay protocol stack is disposed between the PDCP layer and the layer 2 protocol stack of the PC5 interface; or the relay protocol stack is a media access control (MAC) layer protocol stack.

Optionally, the relay protocol stack includes a relay receiving entity. The relay receiving entity may receive the relay protocol data unit (PDU) from the relay UE (i.e., the last hop node) and then transmit the first PDCP PDU in the relay PDU to the PDCP layer.

The foregoing relay PDU may be a first relay PDU uncasted and sent by the first remote UE to the second remote UE, or the foregoing relay PDU may be a broadcast relay PDU broadcasted and sent by the first remote UE to other remote UE. An exemplary description of the two possibilities is illustrated in the subsequent paragraphs.

In Case 1, the relay PDU includes a first relay PDU; the first relay PDU is a PDU sent by the first remote UE to the second remote UE.

The first remote UE attempts to perform unicast communication with the second remote UE and sends the first relay PDU to the second remote UE.

Optionally, the protocol header of the first relay PDU includes a first source ID and a first destination ID; the first source ID includes the UE ID of the first remote UE; the first destination ID includes the UE ID of the second remote UE.

The first source ID is an identifier used to identify the source of the relay PDU. After receiving the first relay PDU, other terminals (relay UE or other remote UE) may determine that the relay PDU is a relay PDU sent by the first remote UE according to the first source ID.

The first destination ID is an identifier used to identify the destination UE of the relay PDU. After receiving the relay PDU, other terminals (the relay UE or other remote UE) may determine whether the relay PDU is a relay PDU for these other terminals according to the first destination ID.

Optionally, when the first destination ID in the first relay PDU is the same as the UE ID of the second remote UE, the relay receiving entity transmits the first PDCP PDU to the PDCP layer. The first PDCP PDU includes at least one of a first signaling and a first data packet, the first signaling is a signaling related to the first remote UE as the sender, and the first data packet is a data packet related to the first remote UE as the sender.

For example, when the first destination ID is the UE ID of the second remote UE, after receiving the first relay PDU, the second remote UE determines that the first relay PDU is a PDU for the second remote UE through the destination ID, and the first PDCP PDU in the first relay PDU is transmitted to the upper layer.

The first relay PDU may include the first PDCP PDU. Since the first relay PDU is the first relay PDU sent by the first remote UE to the second remote UE, the first PDCP PDU may include a signaling related to the first remote UE or may include a first Data packet related to the remote UE. The embodiments of the application do not limit the specific content of the first signaling and the first data packet.

In Case 2, the relay PDU includes a broadcast relay PDU; the broadcast relay PDU is a PDU broadcasted and sent by the first remote UE to other remote UE. The first remote UE attempts to perform broadcast communication with other remote UE and sends broadcast relay PDUs to several other remote UEs (including the second remote UE).

Optionally, the protocol header of the broadcast relay PDU includes a first source ID and a first destination ID. The first source ID includes a UE ID of the first remote UE; and the first destination ID includes a broadcast ID.

The first source ID is an identifier used to identify the source of the relay PDU. After receiving the broadcast relay PDU, other terminals (relay UE or other remote UE) may determine that the broadcast relay PDU is a relay PDU sent by the first remote UE according to the source ID.

The first destination ID is an identifier used to identify the destination UE of the relay PDU. Optionally, when the first destination ID is a broadcast ID, the broadcast ID may be agreed between communication equipment, such as "0XFFFFFF".

Optionally, when the first destination ID includes a broadcast ID, the relay receiving entity transmits the first PDCP PDU to the PDCP layer, where the PDCP PDU includes at least one of a broadcast data packet and a broadcast signaling.

Since the first destination ID is the broadcast ID, after receiving the broadcast relay PDU, other terminals (relay UE or other remote UE) can determine that the broadcast relay PDU is a PDU broadcasted and sent by the first remote UE according to the broadcast ID and all can transmit the first PDCP PDU in the relay PDU to the upper layer protocol.

The broadcast relay PDU may include the first PDCP PDU. Since the broadcast relay PDU is a broadcast relay PDU sent by the first remote UE to other remote UE, the first PDCP PDU may include a broadcast signaling or a broadcast data packet The embodiments of the application do not limit the specific content of broadcast signaling and broadcast data packets.

In an optional example, the relay protocol stack further includes a relay sending entity. The relay sending entity receives the PDCP PDU sent by the PDCP layer, generates a second relay PDU according to the PDCP PDU, and sends the second relay PDU to the next hop node.

The second relay PDU is a relay PDU sent by the second remote UE to the first remote UE.

After receiving the relay PDU sent by the second remote UE, the second remote UE establishes a route from the first remote UE to the second remote UE and stores the route in the relay routing table of the relay UE and the second remote UE. When the second remote UE is interested in the service of the relay PDU sent by the first remote UE, the second remote UE may send the second relay PDU to the first remote UE. The second remote UE can send the second relay PDU to the first remote UE through the established relay path. The second remote UE may send the second relay PDU through the relay sending entity in the relay protocol stack.

In an optional example, the relay receiving entity establishes the second routing relationship in the relay routing table when no routing relationship corresponding to the first source ID is included in the relay routing table; the second routing relationship includes the UE ID of the first remote UE and the node ID of the last hop node; the second routing relationship is a routing relationship when the UE ID of the first remote UE is used as the destination ID.

The relay receiving entity receives a new first source ID, where the first source ID may be the source ID in the first relay PDU or the source ID in the broadcast relay PDU. The relay receiving entity may add a record in the relay routing table to establish a new routing relationship, that is, the second routing relationship.

For example, the first source ID (i.e., the UE ID of the first remote UE) is RMUE1, the current node is the second remote UE, the last hop node is the relay UE Relay UE1, and the node ID of the last hop node is RLUE1. The routing relationship corresponding to the first source ID refers to a routing relationship in which the destination ID bit in the routing relationship is the same as the first source ID, such as the routing relationship (RMUE1, RLUE2). When no routing relationship corresponding to the first source ID is included in the relay routing table, the relay receiving entity may use the second source ID as the destination ID in the opposite direction and establish a second routing relationship (RMUE1, RLUE1) in the relay routing table.

In an optional example, when the relay protocol stack is located between the PDCP layer and the layer 2 protocol stack of the PC5 interface, the relay PDU further includes a first radio bearer identifier, and the relay receiving entity transmits the radio bearer identifier to the PDCP layer protocol stack; or when the relay protocol stack is a MAC layer protocol stack, the relay PDU further includes a first logical channel index, and the relay receiving entity transmits the logical channel index to the PDCP layer protocol stack.

The first radio bearer identifier is an identifier for distinguishing radio bearers between remote UE. The radio bearer can be a signaling radio bearer (SRB) or a data radio bearer (DRB). Because the first remote UE is in the sidelink mode, the SRB is the sidelink signaling radio bearer (SL SRB), DRB is the sidelink data radio bearer (SL DRB), and the corresponding first radio bearer identifiers are the SL SRB ID and the SL DRB ID, respectively. When the relay protocol stack is located between the PDCP layer and the layer 2 protocol stack of the PC5 interface, the second remote UE can transmit the first radio bearer identifier to the upper-layer protocol through the relay receiving entity, thereby determining the radio bearer between the two remote UEs.

The first logical channel index (LCID) is an identifier for distinguishing logical channels between the MAC layer and the RLC layer. When the relay protocol stack is implemented in the MAC layer, the PDCP PDU multiplexed in the MAC layer is associated with the first logical channel index (LCID), there is a one-to-one mapping relationship between the radio bearer and the first logical channel index, and the second remote UE may transmit the first logical channel index to the upper layer protocol through the relay receiving entity, so as to determine the radio bearer between the two remote UEs.

In an optional example, the end-to-end protocol stack between at least two remote UEs includes a PDCP layer protocol stack of the PC5 interface and other protocol layers located above the PDCP protocol layer.

Optionally, other protocol layers above the PDCP protocol layer include other user plane protocol layers, such as SDAP and IP protocol layers, and other control plane protocol layers, such as a RRC layer and a non-access stratum (NAS).

In an optional example, the point-to-point protocol stack between the second remote UE and the last hop node includes the layer 2 protocol stack and the layer 1 protocol stack of the PC5 interface, the layer 2 protocol stack includes the RLC layer protocol stack and the MAC layer protocol stack, and the layer 1 protocol stack includes the PHY layer protocol stack.

Optionally, the last hop node refers to a relay UE around the second remote UE. Note that the foregoing layer 1 protocol stack and layer 2 protocol stack include but are not limited to an RLC layer protocol stack, a MAC layer protocol stack, and a PHY layer protocol stack, which are not limited in the embodiments of the application.

In summary, in the relay method provided in the embodiment, the second remote UE includes a relay protocol stack, and the relay protocol stack includes a relay receiving entity. The relay receiving entity may receive the relay PDU from the last hop node and transmit the first PDCP PDU in the relay PDU to the PDCP layer. In the indirect communication mode between two remote UEs, the application introduces a relay protocol layer into the protocol stack of the second remote UE, so that the relay receiving entity can receive the relay PDU from the last hop node. With the configuration in which the last hop node does not need to receive the network equipment, the transmission overhead is saved and the transmission efficiency is improved.

In the relay method provided in the embodiment, two possible positions of the relay protocol stack are provided. The relay protocol stack can be either located between the PDCP layer and the layer 2 protocol stack or implemented by the original MAC layer, which improves the flexibility of the configuration of the relay method.

In the subsequent paragraphs, the process of the communication between the first remote UE and the second remote UE through the relay UE in the application is illustrated.

Figure 7:
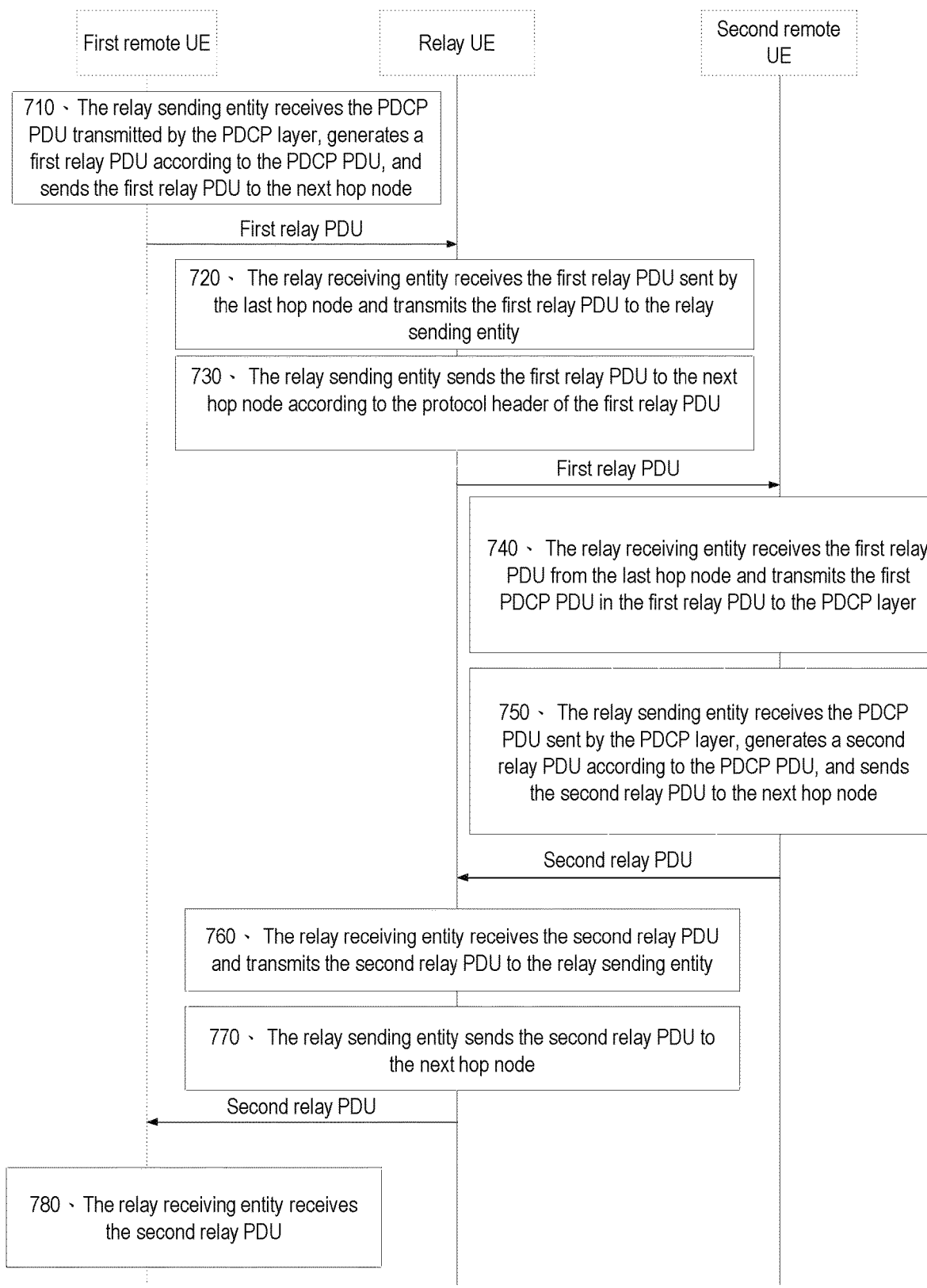
FIG. 7 is a flowchart of a relay method provided by an exemplary embodiment of the application.

As shown in FIG. 7, FIG. 7 is a flowchart of a relay method according to an exemplary embodiment of the application, and the relay method is applied to the communication system shown in FIG. 1. The communication system includes first remote UE, relay UE, and second remote UE. The first remote UE, the relay UE, and the second remote UE all include a relay protocol stack. The relay protocol stack is located between the PDCP layer and the layer 2 protocol stack of the PC5 interface, or the relay protocol stack is a MAC layer protocol stack, and the relay protocol stack includes a relay receiving entity and a relay sending entity. The relay method may include at least part of the content as follows.

In step 710, the relay sending entity of the first remote UE receives the PDCP PDU transmitted by the PDCP layer, generates a first relay PDU according to the PDCP PDU, and sends the first relay PDU to the next hop node.

The first relay PDU is a PDU sent by the first remote UE to the second remote UE.

In step 720, the relay receiving entity of the relay UE receives the first relay PDU sent by the last hop node and transmits the first relay PDU to the relay sending entity.

For example, the last hop node is the first remote UE.

Optionally, the point-to-point protocol stack between the relay UE and the last hop node includes the layer 2 protocol stack and the layer 1 protocol stack of the 3GPP PC5 interface, the layer 2 protocol stack includes the RLC layer protocol stack and the MAC layer protocol stack, and the layer 1 protocol stack includes the PHY layer protocol stack.

In step 730, the relay sending entity of the relay UE sends the first relay PDU to the next hop node according to the protocol header of the first relay PDU.

For example, the next hop node is the second remote UE.

Optionally, the protocol header of the first relay PDU may include a source ID and a destination ID.

In step 740, the relay receiving entity of the second remote UE receives the first relay PDU from the last hop node and transmits the first PDCP PDU in the first relay PDU to the PDCP layer.

Optionally, the last hop node is a relay UE.

In step 750, the relay sending entity of the second remote UE receives the PDCP PDU sent by the PDCP layer, generates a second relay PDU according to the PDCP PDU, and sends the second relay PDU to the next hop node.

The second relay PDU is a relay PDU sent by the second remote UE to the first remote UE. The next hop node is the relay UE directly connected to the network equipment.

In step 760, the relay receiving entity of the relay UE receives the second relay PDU and transmits the second relay PDU to the relay sending entity.

The last hop node is the second remote UE, or the last hop node is another relay UE located between the relay UE and the second remote UE.

Note that when the relay receiving entity determines that the protocol header of the second relay PDU further includes the broadcast ID, the second relay PDU is transmitted to the upper layer.

In step 770, the relay sending entity of the relay UE sends the second relay PDU to the next hop node.

The next hop node is remote UE, or the next hop node is another relay UE located between the relay UE and the remote UE.

In step 780, the relay receiving entity of the first remote UE receives the second relay PDU.

Optionally, the relay receiving entity transmits the second relay PDU to the upper layer when it is determined that the second destination ID in the protocol header of the second relay PDU is the same as the UE ID of the first remote UE.

Note that in the embodiment, the relay method is illustrated with the first relay PDU received by the second remote UE, and the first relay PDU is a PDU uncasted and sent by the first remote UE to the second remote UE. In other embodiments, what the second remote UE receives may also be a PDU broadcasted and sent by the first remote UE, that is, a broadcast PDU.

In addition, the relay method in the application can be implemented either by introducing a new relay protocol stack between the PDCP layer and the layer 2 protocol stack or with the MAC layer.

Figure 8:
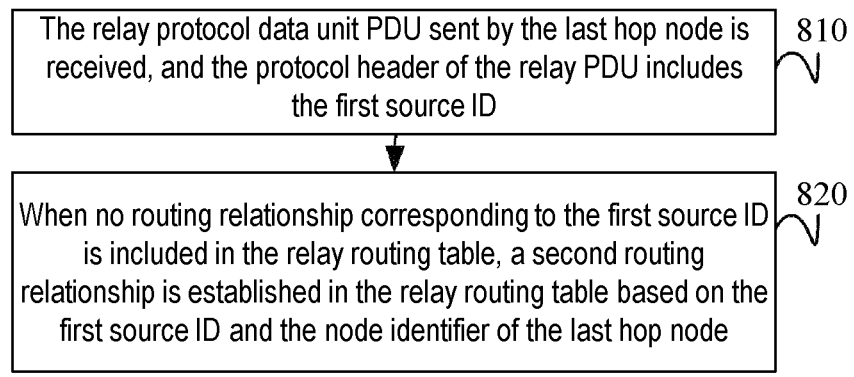
FIG. 8 is a flowchart of a routing table generation method provided by an exemplary embodiment of the application.

FIG. 8 is a flowchart of a routing table generation method according to an exemplary embodiment of the application. The generation method can be applied to relay UE or remote UE, and the generation method includes steps as follows.

In step 810, the relay protocol data unit (PDU) sent by the last hop node is received, and the protocol header of the relay PDU includes the first source ID.

The relay PDU is a PDU sent between two remote UEs, and the first source ID includes a UE ID of the first remote UE.

For example, the first remote UE Remote UE1 is connected to the second remote UE Remote UE2 through Relay UE1 and Relay UE2 in sequence. In step 810, the implementation subject is Relay UE2, and the last hop node is Relay UE1. The first source ID is the UE ID "RMUE1" of the first remote UE.

For example, the first remote UE Remote UE1 is connected to the second remote UE Remote UE2 through Relay UE1 and Relay UE2 in sequence. In step 810, the implementation subject is Remote UE2, and the last hop node is Relay UE2. The first source ID is the UE ID "RMUE1" of the first remote UE.

The foregoing relay PDU may be a first relay PDU uncasted and sent by the first remote UE to the second remote UE, or the foregoing relay PDU may be a broadcast relay PDU broadcasted and sent by the first remote UE to other remote UE. An exemplary description of the two possibilities is illustrated in the subsequent paragraphs.

In Case 1, the relay PDU includes a first relay PDU; the first relay PDU is a PDU sent by the first remote UE to the second remote UE.

The first remote UE attempts to perform unicast communication with the second remote UE and sends the first relay PDU to the second remote UE.

Optionally, the protocol header of the first relay PDU further includes a first destination ID; the first destination ID includes the UE ID of the second remote UE.

After receiving the first relay PDU, the relay UE (or other remote UE) may determine whether the relay PDU is a PDU for the relay UE according to the first destination ID.

Optionally, the first relay PDU further includes a first PDCP PDU. The first PDCP PDU includes at least one of a first signaling and a first data packet, the first signaling is a signaling related to the first remote UE as the sender, and the first data packet is a data packet related to the first remote UE as the sender.

In Case 2, the relay PDU includes a broadcast relay PDU; the broadcast relay PDU is a PDU broadcasted and sent by the first remote UE to other remote UE.

The first remote UE attempts to perform broadcast communication with other remote UE and sends broadcast relay PDUs to several other remote UEs.

Optionally, the protocol header of the broadcast relay PDU further includes a first destination ID; and the first destination ID includes a broadcast ID.

Since the destination ID is the broadcast ID, the destination UEs of the broadcast relay PDU are multiple other terminals (relay UE or other remote UE).

Optionally, the broadcast relay PDU further includes a first PDCP PDU, and the first PDCP PDU includes at least one of a broadcast data packet and a broadcast signaling.

In an example, when the relay protocol stack is located between the PDCP layer and the layer 2 protocol stack of the PC5 interface, the relay PDU further includes a first radio bearer identifier; when the relay protocol stack is a MAC layer protocol stack, the relay PDU further includes a first logical channel index.

In step 820, when no routing relationship corresponding to the first source ID is included in the relay routing table, a second routing relationship is established in the relay routing table based on the first source ID and the node ID of the last hop node.

The second routing relationship is a routing relationship when the UE ID of the first remote UE is used as the destination ID.

The relay receiving entity receives a new first source ID, where the first source ID may be the source ID in the first relay PDU or the source ID in the broadcast relay PDU. The relay UE may add a record in the relay routing table to establish a new routing relationship, that is, the second routing relationship.

For example, the first source ID (i.e., the UE ID of the first remote UE) is RMUE1, the current node is the relay UE Relay UE1, and the node ID of the last hop node is RMUE1, that is, the last hop node is the first remote UE. The routing relationship corresponding to the first source ID refers to a routing relationship in which the destination ID bit in the routing relationship is the same as the first source ID, such as the routing relationship (RMUE1, RLUE1). When no routing relationship corresponding to the first source ID is included in the relay routing table, the relay receiving entity may use the second source ID as the destination ID in the opposite direction and establish a second routing relationship (RMUE1, RMUE1) in the relay routing table.

In an optional example, the generation method further includes steps as follows. A second relay PDU is received. The second relay PDU is a PDU sent by the second remote UE to the first remote UE, and a second source ID of the second relay PDU includes a UE ID of the second remote UE; when no routing relationship corresponding to the second source ID is included in the relay routing table, the first routing relationship is established in the relay routing table based on the second source ID and the node ID of the last hop node; the first routing relationship includes the UE ID of the second remote UE and the node ID of the last hop node; the first routing relationship is a routing relationship when the UE ID of the second remote UE is used as the destination ID.

After receiving a new source ID, the relay receiving entity may add a record in the relay routing table to establish a new routing relationship.

For example, the second source ID (i.e., the UE ID of the second remote UE) is RMUE2, the current node is the first remote UE, the last hop node is the relay UE Relay UE1, and the node ID of the last hop node is RLUE1. When the destination ID bit of the routing relationship (RMUE2, RLUE3) is the same as the second source ID, the routing relationship is the routing relationship corresponding to the second source ID. The node ID of the relay UE Relay UE3 is RLUE3. When no routing relationship corresponding to the second source ID is included in the relay routing table, the relay receiving entity may use the second source ID as the destination ID in the opposite direction and establish the second routing relationship (RMUE2, RLUE1) in the relay routing table.

In summary, with the generation method provided in the embodiment, when receiving a relay PDU, the relay UE (or remote UE) can establish a new routing relationship according to the source ID of the relay PDU and the routing relationship in the relay routing table, thereby dynamically updating the relay routing table. Moreover, the transmission route of the relay PDU can be defined according to the relay routing table, and the relay scheme is more flexible and efficient.

Note that the routing table generation method is applicable to not only the relay UE but also the first remote UE and the second remote UE.

Figure 9:
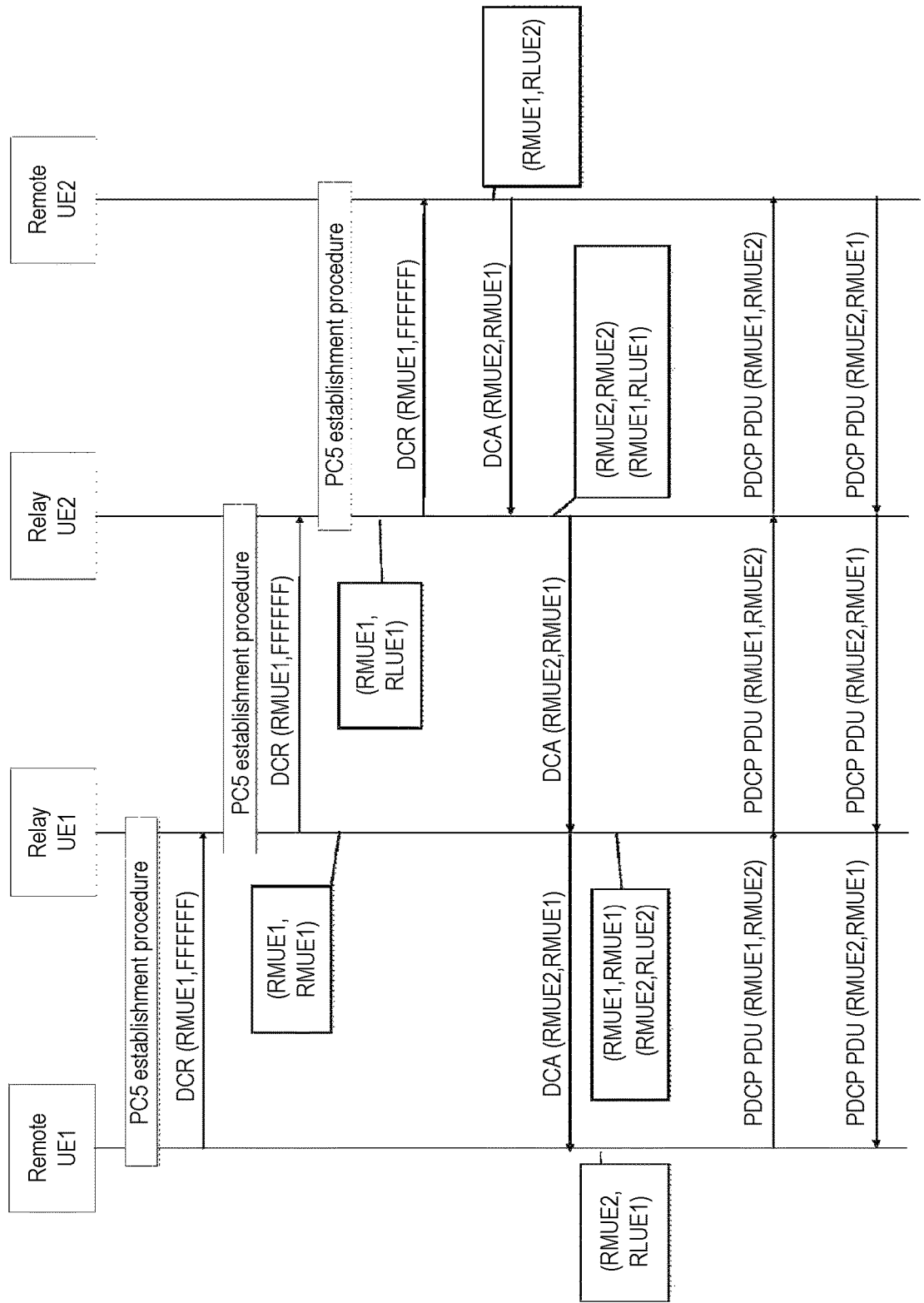
FIG. 9 is a schematic view illustrating communication between remote UE provided by an exemplary embodiment of the application.

FIG. 9 is a schematic view illustrating communication between two remote UE provided by an exemplary embodiment of the application. In the embodiment, Remote UE1 is the first remote UE, Remote UE2 is the second remote UE, and Relay UE1 and Relay UE2 are two pieces of relay UE.

Remote UE1 communicates with Remote UE2 through Relay UE1 and Relay UE2. When Remote UE1 finds that the direct communication with Remote UE2 through direct connection fails, and there is a Relay UE1 nearby, the Remote UE1 sends a direct communication request (DCR) message to the Relay UE1, tries to find the Remote UE2, and establishes an indirect connection with the Remote UE2. Specifically, the steps are as follows.

In step 1, a point-to-point PC5 connection is established between the Remote UE1 and the Relay UE1, and a radio bearer for sending and receiving relay PDUs is established.

In step 2, the Remote UE1 sends a DCR message to the Relay UE1. In the protocol header of the relay PDU, source ID=RMUE1, destination ID=0XFFFFFF, where 0XFFFFFF is agreed and a destination ID used for broadcast purposes. Relay UE1 and surrounding terminals establish a PC5 connection and a radio bearer for sending and receiving relay PDUs. When Relay UE1 receives the relay PDU of Remote UE1, RMUE1 is found a new source ID, a point-to-point PC5 connection is established between Remote UE1 and Relay UE1, and then Relay UE1 establishes a routing record (RMUE1, RMUE1) locally.

In step 3, the behaviors of Relay UE2 and Relay UE1 are consistent, and Relay UE2 and surrounding terminals establish a PC5 connection and a radio bearer for sending and receiving relay PDUs. The source ID (RMUE1) in the relay PDU is not included in the relay routing table, then the Relay UE2 uses the source ID as the destination ID in the opposite direction, and (source ID, prior ID) is recorded. The prior ID is RLUE1, that is, a routing record (RMUE1, RLUE1) is established locally.

In step 4, when receiving the DCR message, the Remote UE2 is found to be the terminal that Remote UE1 is looking for, or the Remote UE2 is interested in the service described in the DCR message, so a direct communication accept (DCA) message is sent correspondingly. Based on the same algorithm, if the source ID (RMUE1) in the relay PDU is not in the relay routing table, then Remote UE2 uses this source ID as the destination ID in the opposite direction, and (source ID, prior ID) is recorded. The prior ID is RLUE2, that is, a routing record (RMUE1, RLUE2) is established locally. In the relay PDU including the DCA message, source ID=RMUE2, destination ID=RMUE1. This DCA message is included in a PDCP PDU, and the identifier of the radio bearer is configured as the identifier of the SL SRB.

In step 5, after receiving the relay PDU including the DCA message, the Relay UE2 finds that source ID=RMUE2 is the new source ID, and a point-to-point PC5 connection is established between the Remote UE2 and the Relay UE2, so a routing record (RMUE2, RMUE2) is established. Then, the Relay UE2 finds that destination ID=RMUE1 according to the existing routing record (RMUE1, RLUE1) and then sends and forwards this relay PDU to the relay UE Relay UE1 whose address is RLUE1.

In step 6, after receiving the relay PDU including the DCA message, the Relay UE1 finds that SOURCE ID=RMUE2 is the new source ID, the Relay UE1 uses this source ID as the destination ID in the opposite direction, and (source ID, prior ID) is recorded. The prior ID is RLUE2, that is, a routing record (RMUE2, RLUE2) is established. Then, the Relay UE1 finds that destination ID=RMUE1 according to the existing routing record (RMUE1, RMUE1) and sends and forwards this relay PDU to the first remote UE Remote UE1 whose address is RMUE1.

In step 7, after receiving the relay PDU, the Remote UE1 finds that source ID=RMUE2 is the new source ID, remote UE1 uses this source ID as the destination ID in the opposite direction, and (source ID, prior ID) is recorded. The prior ID is RLUE1, that is, the routing record (RMUE2, RLUE1) is established locally, and because the destination ID=RMUE1, the PDCP PDU and the radio bearer identifier included in the relay PDU are transmitted to the upper layer protocol. Meanwhile, the PDCP PDU includes the DCA message.

After the 7 steps, the route between Remote UE1 and Remote UE2 through Relay UE1 and Relay UE2 is established. Thereafter, for other relay PDUs between Remote UE1 and Remote UE2, Relay UE1 and Relay UE2 may perform routing according to the local relay routing table.

Figure 10:
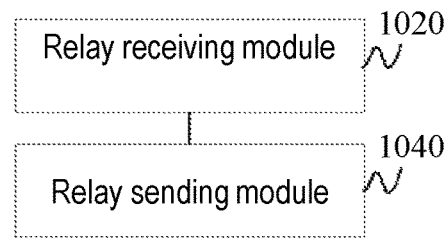
FIG. 10 is a schematic view of a relay apparatus provided by an exemplary embodiment of the application.

FIG. 10 shows a block diagram of a relay apparatus provided by an exemplary embodiment of the application. The relay apparatus includes a relay protocol stack. The relay protocol stack is located between the PDCP layer and the layer 2 protocol stack of the PC5 interface, or the relay protocol stack is a MAC layer protocol stack. The relay protocol stack includes a relay receiving module 1020 and a relay sending module 1040. The apparatus includes the following.

The relay receiving module 1020 is configured to receive the relay protocol data unit (PDU) sent by the last hop node and forward the relay PDU to the relay sending module.

The relay sending module 1040 is configured to send the relay PDU to the next hop node according to the protocol header of the relay PDU.

The relay PDU is a PDU sent between at least two remote UEs.

In an optional embodiment, the relay PDU includes a first relay PDU; and the first relay PDU is a PDU sent by the first remote UE to the second remote UE.

In an optional embodiment, the protocol header of the first relay PDU includes a first source ID and a first destination ID; the first source ID includes the UE ID of the first remote UE; the first destination ID includes the UE ID of the second remote UE.

In an optional embodiment, the relay receiving module 1020 is configured to forward the first relay PDU to the relay sending module when the first destination ID is not equal to the UE ID of the relay UE.

In an optional embodiment, when a first routing relationship corresponding to the first destination ID is included in the relay routing table, the relay sending module 1040 is configured to send the first relay PDU to the next hop node according to the first routing relationship; the first routing relationship includes the UE ID of the second remote UE and the node ID of the next hop node, and the first routing relationship is the routing relationship when the UE ID of the second remote UE is used as the destination ID.

In an optional embodiment, the relay sending module 1040 is configured to send the first relay PDU to the default next hop node when no first routing relationship corresponding to the first destination ID is included in the relay routing table. The number of the default next hop nodes is at least one.

In an optional embodiment, the first relay PDU further includes a first PDCP PDU. The first PDCP PDU includes at least one of a first signaling and a first data packet, the first signaling is a signaling related to the first remote UE as the sender, and the first data packet is a data packet related to the first remote UE as the sender.

In an optional embodiment, the relay PDU includes a broadcast relay PDU; the broadcast relay PDU is a PDU broadcasted and sent by the first remote UE to other remote UE.

In an optional embodiment, the protocol header of the broadcast relay PDU includes a first source ID and a first destination ID; the first source ID includes a UE ID of the first remote apparatus; the first destination ID includes a broadcast ID.

In an optional embodiment, the relay receiving module 1020 is configured to forward the broadcast relay PDU to the relay sending module when the first destination ID includes the broadcast ID.

In an optional embodiment, the relay sending module 1040 is configured to send the broadcast relay PDU to the next hop node when the first destination ID includes the broadcast ID.

In an optional embodiment, the broadcast relay PDU further includes a first PDCP PDU, and the relay receiving module 1020 is configured to transmit the first PDCP PDU to the PDCP layer when the first destination ID includes the broadcast ID. The first PDCP PDU includes at least one of a broadcast data packet and a broadcast signaling.

In an optional embodiment, the relay receiving module 1020 is configured to receive a second relay PDU, where the second relay PDU is a PDU sent by the second remote UE to the first remote UE, and the second source ID of the second relay PDU includes the UE ID of the second remote UE; the relay receiving module 1020 is configured to establish a first routing relationship in the relay routing table when no routing relationship corresponding to the second source ID is included in the relay routing table; the first routing relationship includes the UE ID of the second remote UE and the node ID of the next hop node, and the first routing relationship is the routing relationship when the UE ID of the second remote UE is used as the destination ID.

In an optional embodiment, the relay receiving module 1020 is configured to establish a second routing relationship in the relay routing table when no routing relationship corresponding to the first source ID is included in the relay routing table.

The second routing relationship includes the UE ID of the first remote UE and the node ID of the last hop node; the second routing relationship is the routing relationship when the UE ID of the first remote UE is used as the destination identification.

In an optional embodiment, when the relay protocol stack is located between the PDCP layer and the layer 2 protocol stack of the PC5 interface, the relay PDU further includes a first radio bearer identifier; when the relay protocol stack is a MAC layer protocol stack, the relay PDU further includes a first logical channel index.

In an optional embodiment, the end-to-end protocol stack between at least two remote UEs includes a PDCP layer protocol stack of the PC5 interface and other protocol layers located above the PDCP protocol layer.

In an optional embodiment, the point-to-point protocol stack between the relay UE and the last hop node includes the layer 2 protocol stack and the layer 1 protocol stack of the PC5 interface, the layer 2 protocol stack includes the RLC layer protocol stack and the MAC layer protocol stack, and the layer 1 protocol stack includes the PHY layer protocol stack.

Figure 11:
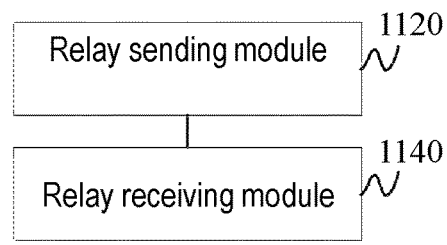
FIG. 11 is a schematic view of a relay apparatus provided by an exemplary embodiment of the application.

FIG. 11 is a block diagram of a first remote apparatus provided by an exemplary embodiment of the application. The first remote apparatus includes a relay protocol stack, and the relay protocol stack is located between the PDCP layer and the layer 2 protocol stack of the PC5 interface, or the relay protocol stack is a MAC layer protocol stack. The relay protocol stack includes a relay sending module 1120. The apparatus includes the following.

The relay sending module 1120 is configured to receive the PDCP PDU transmitted by the PDCP layer protocol stack, generate a relay protocol data unit (PDU) according to the PDCP PDU, and send the relay PDU to the next hop node.

The relay PDU is a PDU sent between at least two remote apparatuses.

In an optional embodiment, the relay PDU includes a first relay PDU; the first relay PDU is a PDU sent by the first remote apparatus to a second remote apparatus.

In an optional embodiment, the protocol header of the first relay PDU includes a first source ID and a first destination ID; the first source ID includes the UE ID of the first remote UE; the first destination ID includes the UE ID of the second remote UE.

In an optional embodiment, the relay sending module 1120 is configured to send the first relay PDU to the next hop node according to the first routing relationship when the first routing relationship corresponding to the first destination ID is included in the relay routing table; the first routing relationship includes the UE ID of the second remote apparatus and the node ID of the next hop node, and the first routing relationship is the routing relationship when the UE ID of the second remote apparatus is used as the destination ID.

In an optional embodiment, the first relay PDU further includes a first PDCP PDU. The first PDCP PDU includes at least one of a first signaling and a first data packet, the first signaling is a signaling related to the first remote apparatus as the sender, and the first data packet is a data packet related to the first remote apparatus as the sender.

In an optional embodiment, the relay PDU includes a broadcast relay PDU; the broadcast relay PDU is a PDU broadcasted and sent by the first remote apparatus to other remote apparatuses.

In an optional embodiment, the protocol header of the broadcast relay PDU includes a first source ID and a first destination ID; the first source ID includes a UE ID of the first remote apparatus; the first destination ID includes a broadcast ID.

In an optional embodiment, the broadcast relay PDU further includes a first PDCP PDU, and the first PDCP PDU includes at least one of a broadcast data packet and a broadcast signaling.

In an optional embodiment, the apparatus further includes a relay receiving module 1140, configured to receive a second relay PDU, where the second relay PDU is a PDU sent by the second remote apparatus to the first remote apparatus. The second source ID of the second relay PDU includes the UE ID of the second remote apparatus; the relay receiving module 1140 is configured to establish the first routing relationship in the relay routing table when no routing relationship corresponding to the second source ID is included in the relay routing table; the first routing relationship includes the UE ID of the second remote apparatus and the node ID of the next hop node, and the first routing relationship is the routing relationship when the UE ID of the second remote apparatus is used as the destination ID.

In an optional embodiment, when the relay protocol stack is located between the PDCP layer and the layer 2 protocol stack of the PC5 interface, the relay PDU further includes a first radio bearer identifier; when the relay protocol stack is a MAC layer protocol stack, the relay PDU further includes a first logical channel index.

In an optional embodiment, the end-to-end protocol stack between at least two remote apparatuses includes a PDCP layer protocol stack of the PC5 interface and other protocol layers located above the PDCP protocol layer.

In an optional embodiment, the point-to-point protocol stack between the first remote apparatus and the next hop node includes the layer 2 protocol stack and the layer 1 protocol stack of the PC5 interface, the layer 2 protocol stack includes the RLC layer protocol stack and the MAC layer protocol stack, and the layer 1 protocol stack includes the PHY layer protocol stack.

In an optional embodiment, the relay protocol stack further includes a relay receiving module, the device further includes the relay receiving module 1140 configured to receive a second relay PDU, and the second relay PDU is a relay PDU sent by the second remote apparatus to the first remote apparatus.

In an optional embodiment, the second relay PDU includes the second PDCP PDU; and the relay receiving module 1140 is configured to transmit the second PDCP PDU to an upper layer protocol.

In an optional embodiment, when the relay protocol stack is located between the PDCP layer and the layer 2 protocol stack of the PC5 interface, the second relay PDU further includes a second radio bearer identifier, and the relay receiving module 1140 is configured to transmit the second radio bearer identifier to the PDCP layer protocol stack; or when the relay protocol stack is the MAC layer protocol stack, the second relay PDU further includes the second logical channel index, and the relay receiving module 1140 is configured to transmit the second logical channel index to the PDCP layer protocol stack.

In an optional embodiment, when a sidelink exists between the first remote apparatus and the second remote apparatus, the relay PDU is directly sent to the second remote apparatus through the slidelink.

Figure 12:
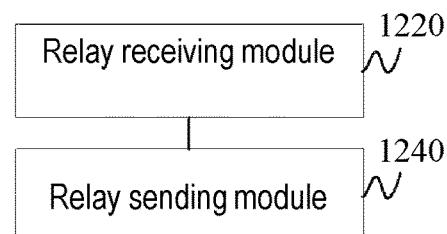
FIG. 12 is a schematic view of a relay apparatus provided by an exemplary embodiment of the application.

FIG. 12 shows a block diagram of a second remote apparatus provided by an exemplary embodiment of the application. The second remote apparatus includes a relay protocol stack, the relay protocol stack is located between the PDCP layer and the layer 2 protocol stack of the PC5 interface, or the relay protocol stack is the MAC layer protocol stack, and the relay protocol stack includes a relay receiving module 1220.

The relay receiving module 1220 is configured to receive the relay protocol data unit (PDU) from the last hop node and transmit the first PDCP PDU in the relay PDU to the PDCP layer.

The relay PDU is a PDU sent between at least two remote apparatuses.

In an optional embodiment, the relay PDU includes a first relay PDU; the first relay PDU is a PDU sent by the first remote apparatus to the second remote apparatus.

In an optional embodiment, the protocol header of the first relay PDU includes a first source ID and a first destination ID; the first source ID includes the UE ID of the first remote UE; the first destination ID includes the UE ID of the second remote UE.

In an optional embodiment, the relay receiving module 1220 is configured to transmit the first PDCP PDU to the PDCP layer when the first destination ID in the first relay PDU is the same as the UE ID of the second remote apparatus. The first PDCP PDU includes at least one of a first signaling and a first data packet, the first signaling is a signaling related to the first remote apparatus as the sender, and the first data packet is a data packet related to the first remote apparatus as the sender.

In an optional embodiment, the relay PDU includes a broadcast relay PDU; the broadcast relay PDU is a PDU broadcasted and sent by the first remote apparatus to other remote apparatuses.

In an optional embodiment, the protocol header of the broadcast relay PDU includes a first source ID and a first destination ID; the first source ID includes a UE ID of the first remote apparatus; the first destination ID includes a broadcast ID.

In an optional embodiment, the relay receiving module 1220 is configured to transmit the first PDCP PDU to the PDCP layer when the first destination ID includes the broadcast ID; the first PDCP PDU includes at least one of a broadcast data packet and a broadcast signaling.

In an optional embodiment, the relay protocol stack further includes a relay sending module 1240; the relay sending module 1240 is configured to receive the PDCP PDU sent by the PDCP layer, generate the second relay PDU according to the PDCP PDU, and send the second relay PDU to the next hop node, where the second relay PDU is a replay PDU sent by the second remote apparatus to the first remote apparatus.

In an optional example, the relay receiving module 1220 is configured to establish the second routing relationship in the relay routing table when no routing relationship corresponding to the first source ID is included in the relay routing table; the second routing relationship includes the UE ID of the first remote UE and the node ID of the last hop node; the second routing relationship is a routing relationship when the UE ID of the first remote UE is used as the destination ID.

In an optional embodiment, when the relay protocol stack is located between the PDCP layer and the layer 2 protocol stack of the PC5 interface, the relay PDU further includes a first radio bearer identifier, and the relay receiving module 1220 is configured for transmitting the first radio bearer identifier to the PDCP layer protocol stack; or when the relay protocol stack is the MAC layer protocol stack, the relay PDU further includes a first logical channel index, and the relay receiving module 1220 is configured to transmit the first logical channel index to the PDCP layer protocol stack.

In an optional embodiment, the end-to-end protocol stack between at least two remote apparatuses includes a PDCP layer protocol stack of the PC5 interface and other protocol layers located above the PDCP protocol layer.

In an optional embodiment, the point-to-point protocol stack between the second remote apparatus and the last hop node includes the layer 2 protocol stack and the layer 1 protocol stack of the PC5 interface, the layer 2 protocol stack includes the RLC layer protocol stack and the MAC layer protocol stack, and the layer 1 protocol stack includes the PHY layer protocol stack.

Figure 13:
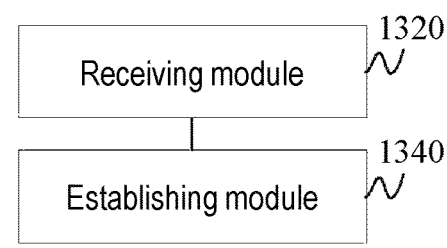
FIG. 13 is a schematic view of a routing table generation apparatus provided by an exemplary embodiment of the application.

FIG. 13 is a block diagram of a routing table generation apparatus provided by an exemplary embodiment of the application. The generation apparatus includes the following.

A receiving module 1320 is configured to receive the relay protocol data unit (PDU) sent by the last hop node, the protocol header of the relay PDU includes the first source ID, and the first source ID includes the UE ID of the first remote UE.

An establishing module 1340 is configured to establish the second routing relationship in the relay routing table when no routing relationship corresponding to the first source ID is included in the relay routing table based on the first source ID and the node ID of the last hop node.

The relay PDU is a PDU sent between two remote UEs, and the second routing relationship is a routing relationship when the UE ID of the first remote UE is used as the destination ID.

In an optional embodiment, the relay PDU includes a first relay PDU; and the first relay PDU is a PDU sent by the first remote UE to the second remote UE.

In an optional embodiment, the protocol header of the first relay PDU further includes a first destination ID; the first destination ID includes the UE ID of the second remote UE.

In an optional embodiment, the first relay PDU further includes a first packet data convergence protocol (PDCP) PDU; the first PDCP PDU includes at least one of a first signaling and a first data packet, the first signaling is a signaling related to the first remote UE as the sender, and the first data packet is a data packet related to the first remote UE as the sender.

In an optional embodiment, the relay PDU includes a broadcast relay PDU; the broadcast relay PDU is a PDU broadcasted and sent by the first remote UE to other remote UE.

In an optional embodiment, the protocol header of the broadcast relay PDU further includes a first destination ID; the first destination ID includes a broadcast ID.

In an optional embodiment, the broadcast relay PDU further includes a first packet data convergence protocol (PDCP) PDU; the first PDCP PDU includes at least one of a broadcast data packet and a broadcast signaling.

In an optional embodiment, when the relay protocol stack is located between the PDCP layer and the layer 2 protocol stack of the PC5 interface, the relay PDU further includes a first radio bearer identifier; when the relay protocol stack is a MAC layer protocol stack, the relay PDU further includes a first logical channel index.

In an optional embodiment, the receiving module 1320 is further configured to receive a second relay PDU, where the second relay PDU is a PDU sent by the second remote UE to the first remote UE. The second source ID of the second relay PDU includes the UE ID of the second remote UE; the establishing module 1340 is further configured to establish the first routing relationship in the relay routing table when no routing relationship corresponding to the second source ID is included in the relay routing table based on the second source ID and the node ID of the last hop node. The first routing relationship includes the UE ID of the second remote UE and the node ID of the last hop node; the first routing relationship is a routing relationship when the UE ID of the second remote UE is used as the destination ID.

Figure 14:
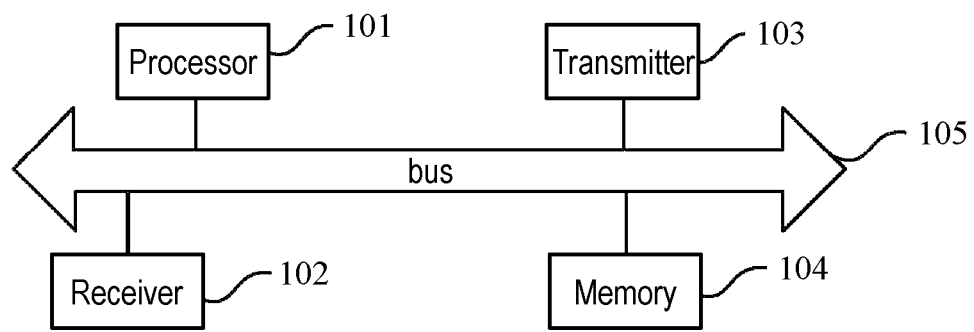
FIG. 14 is a schematic view illustrating a structure of a terminal provided by an exemplary embodiment of the application.

FIG. 14 is a schematic view illustrating a structure of a terminal device (relay UE, first remote UE, or second remote UE) provided by an exemplary embodiment of the application. The terminal device includes a processor 101, a receiver 102, a transmitter 103, memory 104, and a bus 105.

The processor 101 includes one or more processing cores, and the processor 101 executes various functional applications and information processing by running software programs and modules.

The receiver 102 and the transmitter 103 may be implemented as a communication component, which may be a communication chip.

The memory 104 is connected to the processor 101 through the bus 105.

The memory 104 may be configured to store at least one instruction, and the processor 101 may be configured to execute the at least one instruction, so as to implement various steps in the embodiments of the foregoing methods.

Furthermore, the memory 104 may be implemented by any type of volatile or non-volatile storage devices or a combination thereof. The volatile or non-volatile storage devices include but are not limited to a magnetic disk or an optical disk, erasable programmable read only memory (EEPROM), erasable programmable read only memory (EPROM), static random access memory (SRAM), read-only memory (ROM), magnetic memory, flash memory, programmable read-only memory (PROM).

In an exemplary embodiment, a computer-readable storage medium is also provided, the computer-readable storage medium stores at least one instruction, at least one segment of program, a code set or an instruction set. The at least one instruction, the at least one segment of program, the code set or the instruction set is loaded and executed by the processor to implement the relay method or the routing table generation method executed by the terminal device provided by the embodiments of the foregoing methods.

A person of ordinary skill in the art can understand that all or part of the steps in the above embodiments can be implemented by hardware, or by a program to instruct relevant hardware to complete, the program may be stored in a computer-readable storage medium, and the above-mentioned storage medium may be a read-only memory, a magnetic disk, or an optical disk.

The foregoing descriptions are only preferred embodiments of the application and are not intended to limit the application. Any modification, equivalent replacement, improvement, and the like made within the spirit and principle of the application shall be included in the protection scope of the application.

What is claimed is:

1. A relay UE, comprising a relay protocol stack, the relay protocol stack being located between a packet data convergence protocol (PDCP) layer and a layer 2 protocol stack of a PC5 interface, and the relay protocol stack comprising a relay receiving entity and a relay sending entity;
   wherein the relay UE comprises method comprising:
   a processor; and
   memory for storing executable instructions for the processor;
   wherein the processor is configured to execute the instructions stored in the memory to cause the relay UE to perform:
   receiving a relay protocol data unit (PDU) sent by a last hop node through the relay receiving entity; and forwarding the relay PDU to the relay sending entity;
   sending the relay PDU to a next hop node through the relay sending entity according to a protocol header of the relay PDU;
   wherein the relay PDU is a PDU sent between at least two remote UEs;
   wherein the relay PDU comprises a first relay PDU; and the first relay PDU is a PDU sent by a first remote UE to a second remote UE;
   wherein a protocol header of the first relay PDU comprises a first source ID and a first destination ID; the first source ID comprises a UE ID of the first remote UE; and the first destination ID comprises a UE ID of the second remote UE;
   wherein the processor is further configured to execute the instructions stored in the memory to cause the relay UE to perform:
   when a first routing relationship corresponding to the first destination ID is included in a relay routing table, sending the first relay PDU to the next hop node through the relay sending entity according to the first routing relationship;
   wherein the first routing relationship comprises the UE ID of the second remote UE and a node ID of the next hop node, and the first routing relationship is a routing relationship when the UE ID of the second remote UE is used as the destination ID.

2. The relay UE according to claim 1, wherein the processor is further configured to execute the instructions stored in the memory to cause the relay UE to perform:
   when no first routing relationship corresponding to the first destination ID is included in the relay routing table, sending the first relay PDU to a default next hop node through the relay sending entity, wherein a number of the default next hop node is at least one.

3. The relay UE according to claim 1, wherein the processor is further configured to execute the instructions stored in the memory to cause the relay UE to perform:
   establishing a second routing relationship in the relay routing table through the relay receiving entity when no routing relationship corresponding to the first source ID is included in the relay routing table;
   wherein the second routing relationship comprises the UE ID of the first remote UE and the node ID of the last hop node; the second routing relationship is a routing relationship when the UE ID of the first remote UE is used as the destination ID.

4. The relay UE according to claim 1, wherein the first relay PDU further comprises the first PDCP PDU;
   wherein the first PDCP PDU comprises at least one of a first signaling and a first data packet, the first signaling is a signaling related to the first remote UE as a sender, and the first data packet is a data packet related to the first remote UE as a sender.

5. The relay UE according to claim 1, wherein
   when the relay protocol stack is located between the PDCP layer and the layer 2 protocol stack of the PC5 interface, the relay PDU further comprises a first radio bearer identifier.

6. The relay UE according to claim 1, wherein an end-to-end protocol stack between the at least two remote UEs comprises:
   the PDCP layer protocol stack of the PC5 interface and other protocol layers located above the PDCP protocol layer.

7. The relay UE according to claim 1, wherein a point-to-point protocol stack between the relay UE and the last hop node comprises:
   the layer 2 protocol stack and a layer 1 protocol stack of the PC5 interface, wherein the layer 2 protocol stack comprises a radio link control (RLC) layer protocol stack and a MAC layer protocol stack, and the layer 1 protocol stack comprises a physical (PHY) layer protocol stack.

8. A first remote UE, comprising a relay protocol stack, the relay protocol stack being located between a packet data convergence protocol (PDCP) layer and a layer 2 protocol stack of a PC5 interface, and the relay protocol stack comprising a relay sending entity;
   wherein the first remote UE comprises:
   a processor; and
   memory for storing executable instructions for the processor;
   wherein the processor is configured to execute the instructions stored in the memory to cause the first remote UE to perform:

receiving a PDCP protocol data unit (PDU) transmitted by the PDCP layer protocol stack, generating a relay protocol data unit (PDU) according to the PDCP PDU, and sending the relay PDU to a next hop node through the relay sending entity;

wherein the relay PDU is a PDU sent between at least two remote UEs;

wherein the relay PDU comprises a first relay PDU, and the first relay PDU is a PDU sent by the first remote UE to a second remote UE;

wherein a protocol header of the first relay PDU comprises a first source ID and a first destination ID; the first source ID comprises a UE ID of the first remote UE; and the first destination ID comprises a UE ID of the second remote UE;

wherein the processor is further configured to execute the instructions stored in the memory to cause the first remote UE to perform:

when a first routing relationship corresponding to the first destination ID is included in a relay routing table, sending the first relay PDU to the next hop node through the relay sending entity according to the first routing relationship;

wherein the first routing relationship comprises the UE ID of the second remote UE and a node ID of the next hop node, and the first routing relationship is a routing relationship when the UE ID of the second remote UE is used as the destination ID.

9. The first remote UE according to claim 8, wherein the relay protocol stack further comprises a relay receiving entity, and the processor is further configured to execute the instructions stored in the memory to cause the first remote UE to perform:

receiving a second relay PDU through the relay receiving entity, wherein the second relay PDU is a PDU sent by the second remote UE to the first remote UE, and the second source ID of the second relay PDU comprises the UE ID of the second remote UE;

establishing the first routing relationship in the relay routing table through the relay receiving entity when no routing relationship corresponding to the second source ID is included in the relay routing table.

10. The first remote UE according to claim 8, wherein the processor is further configured to execute the instructions stored in the memory to cause the first remote UE to perform:

when a sidelink exists between the first remote UE and the second remote UE, sending the relay PDU to the second remote UE through the sidelink.

11. The first remote UE according to claim 8, wherein the first relay PDU further comprises a first PDCP PDU;

wherein the first PDCP PDU comprises at least one of a first signaling and a first data packet, the first signaling is a signaling related to the first remote UE as a sender, and the first data packet is a data packet related to the first remote UE as a sender.

12. The first remote UE according to claim 8, wherein when the relay protocol stack is located between the PDCP layer and the layer 2 protocol stack of the PC5 interface, the relay PDU further comprises a first radio bearer identifier.

13. The first remote UE according to claim 8, wherein an end-to-end protocol stack between the at least two remote UEs comprises:

the PDCP layer protocol stack of the PC5 interface and other protocol layers located above the PDCP protocol layer.

14. The first remote UE according to claim 8, wherein a point-to-point protocol stack between the first remote UE and the next hop node comprises:

the layer 2 protocol stack and a layer 1 protocol stack of the PC5 interface, wherein the layer 2 protocol stack comprises a radio link control (RLC) layer protocol stack and a MAC layer protocol stack, and the layer 1 protocol stack comprises a physical (PHY) layer protocol stack.

15. The first remote UE according to claim 8, wherein the relay protocol stack further comprises a relay receiving entity, and the processor is further configured to execute the instructions stored in the memory to cause the first remote UE to perform:

receiving a second relay PDU through the relay receiving entity, wherein the second relay PDU is a relay PDU sent by the second remote UE to the first remote UE.

16. The first remote UE according to claim 15, wherein the second relay PDU comprises a second PDCP PDU;

wherein the relay receiving entity transmits the second PDCP PDU to an upper layer protocol.

17. The first remote UE according to claim 15, wherein when the relay protocol stack is located between the PDCP layer and the layer 2 protocol stack of the PC5 interface, the second relay PDU further comprises a second radio bearer identifier, and the relay receiving entity transmits the second radio bearer identifier to the PDCP layer protocol stack.

18. A second remote UE, comprising a relay protocol stack, the relay protocol stack being located between a packet data convergence protocol (PDCP) layer and a layer 2 protocol stack of a PC5 interface, the relay protocol stack comprising a relay receiving entity and a relay sending entity;

wherein the second remote UE comprises:

a processor; and memory for storing executable instructions for the processor;

wherein the processor is configured to execute the instructions stored in the memory to cause the second remote UE to perform:

receiving a relay protocol data unit (PDU) from a last hop node through the relay receiving entity and transmitting a first PDCP PDU in the relay PDU to the PDCP layer;

wherein the relay PDU is a PDU sent between at least two remote UEs;

wherein the relay PDU comprises a first relay PDU; and the first relay PDU is a PDU sent by a first remote UE to the second remote UE;

wherein a protocol header of the first relay PDU comprises a first source ID and a first destination ID; the first source ID comprises a UE ID of the first remote UE; and the first destination ID comprises a UE ID of the second remote UE;

wherein the first relay PDU is received from the last hop node through the relay sending entity according to a first routing relationship when the first routing relationship corresponding to the first destination ID is included in a relay routing table;

wherein the first routing relationship comprises the UE ID of the second remote UE and a node ID of a next hop node, and the first routing relationship is a routing relationship when the UE ID of the second remote UE is used as the destination ID.

19. The second remote UE according to claim 18, the processor is further configured to execute the instructions stored in the memory to cause the second remote UE to perform:

when the first destination ID in the first relay PDU is the same as the UE ID of the second remote UE, transmitting the first PDCP PDU to the PDCP layer through the relay receiving entity;

wherein the first PDCP PDU comprises at least one of a first signaling and a first data packet, the first signaling is a signaling related to the first remote UE as a sender, and the first data packet is a data packet related to the first remote UE as a sender;

wherein the processor is further configured to execute the instructions stored in the memory to cause the second remote UE to perform:

receiving the PDCP PDU sent by the PDCP layer, generating a second relay PDU according to the PDCP PDU, and sending the second relay PDU to the next hop node through the relay sending entity, wherein the second relay PDU is a relay PDU sent by the second remote UE to the first remote UE.

20. The second remote UE according to claim 18, wherein the processor is further configured to execute the instructions stored in the memory to cause the second remote UE to perform:

establishing a second routing relationship in the relay routing table through the relay receiving entity when no routing relationship corresponding to the first source ID is included in the relay routing table;

wherein the second routing relationship comprises the UE ID of the first remote UE and the node ID of the last hop node; and the second routing relationship is a routing relationship when the UE ID of the first remote UE is used as the destination ID.

\* \* \* \* \*